(12) United States Patent
Zhang

(10) Patent No.: US 11,825,542 B2
(45) Date of Patent: Nov. 21, 2023

(54) METHOD AND DEVICE USED IN COMMUNICATION NODE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 282 days.

(21) Appl. No.: 17/394,361

(22) Filed: Aug. 4, 2021

(65) Prior Publication Data
US 2022/0053589 A1 Feb. 17, 2022

(30) Foreign Application Priority Data

Aug. 13, 2020 (CN) .......................... 202010810406.1
Aug. 17, 2020 (CN) .......................... 202010826835.8

(51) Int. Cl.
H04W 76/19 (2018.01)
H04W 24/04 (2009.01)
(52) U.S. Cl.
CPC ........... *H04W 76/19* (2018.02); *H04W 24/04* (2013.01)
(58) Field of Classification Search
CPC ...... H04W 76/19; H04W 24/04; H04W 24/08
See application file for complete search history.

(56) References Cited

U.S. PATENT DOCUMENTS

| 2022/0225203 | A1* | 7/2022 | Hu | ........................ | H04W 72/56 |
| 2022/0264687 | A1* | 8/2022 | Orsino | .................. | H04W 76/19 |
| 2022/0286881 | A1* | 9/2022 | Orsino | .................. | H04W 24/08 |
| 2022/0345957 | A1* | 10/2022 | Rugeland | .............. | H04W 76/16 |
| 2022/0353775 | A1* | 11/2022 | Wager | ................. | H04W 36/305 |

OTHER PUBLICATIONS

Qualcomm Incorporated; "Fast Recovery from MCG failure" 3GPP TSG-RAN WG2 Meeting #105bis Xi'an, China, Apr. 8-12, 2019 R2-1903067 (Year: 2019).*
Ericsson; "Efficient SCG/SCell (de)activation"; 3GPP TSG-RAN WG2 #111e Electronic meeting, Aug. 17-28, 2020 Tdoc R2-2007598 (Year: 2020).*

\* cited by examiner

*Primary Examiner* — Gary Mui

(57) ABSTRACT

The present disclosure provides a method and device used in a communication node for wireless communications. A communication node determines that an RLF occurs in a first cell; when a second cell is in a first state, as a response to determining that the RLF occurs in the first cell, determines that the second cell enters into a third state, transmits a first message; when a second cell is in a second state, as a response to determining that the RLF occurs in the first cell, transmits a second message; when the second cell is in a third state, as a response to determining that the RLF occurs in the first cell, transmits the first message; the first message is used for a radio link recovery; the second message is used for a radio connection re-establishment; when the second cell is in the first state.

20 Claims, 9 Drawing Sheets

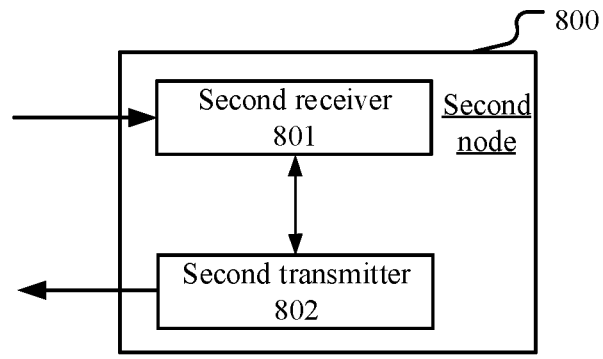
FIG. 8B
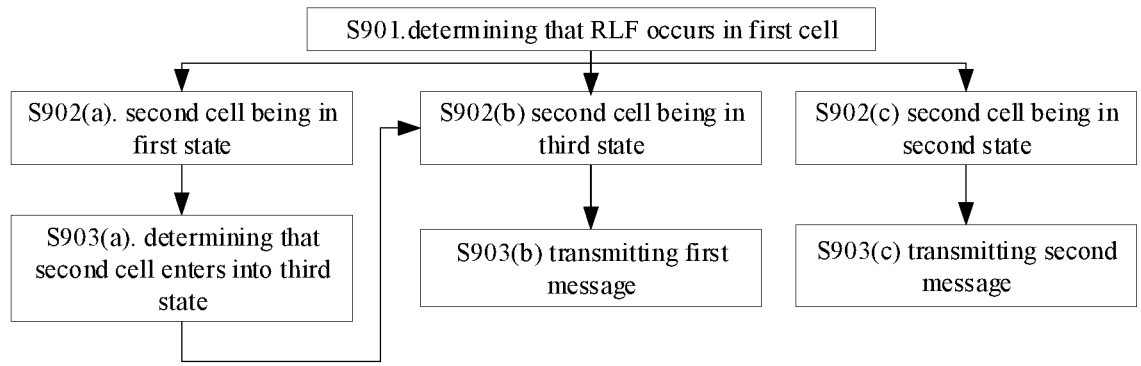
FIG. 9
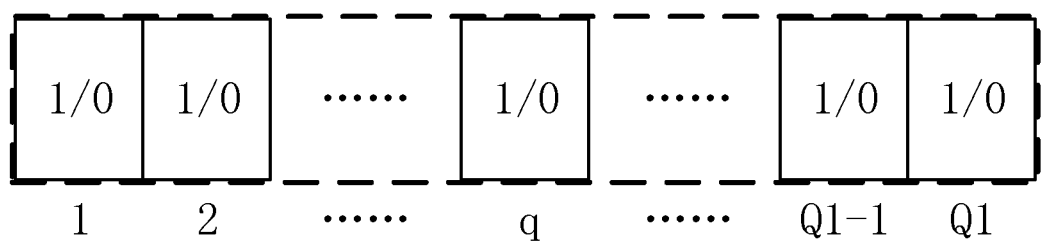
FIG. 10
FIG. 11

METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202010810406.1, filed on 13 Aug. 2020 and the priority benefit of Chinese Patent Application No. 202010826835.8, filed on 17 Aug. 2020, the full disclosure of which is incorporated herein by reference.

BACKGROUND

Technical Field

The present disclosure relates to transmission methods and devices in wireless communication systems, and in particular to a transmission method and device related to dual connectivity.

Related Art

Fast Master Cell Group (MCG) recovery was studied in Work Item (WI) of Enhanced Dual Connectivity and Carrier Aggregation (eDCCA) in Release 16, where recovery of an MCG link through a Secondary Cell Group (SCG) is supported after an MCG Radio Link Failure (RLF) occurs. Release 17 supports an effective SCG activation/de-activation mechanism for WI of "Multi-Radio Dual-Connectivity (MR-DC) enhancements".

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

Dual-connectivity is one of characteristics of NR, a User Equipment (UE) is in connections and communications with two serving cell groups at the same time, which can effectively improve transmission rate of data and reliability of connection. The two serving cell groups are respectively an MCG and an SCG. Generally, the SCG plays the role of load sharing.

A WI of Further Multi-RAT Dual-Connectivity enhancements was approved at 3GPP RAN #86 plenary, one topic of which is to study methods of deactivating and activating the SCG. For instance, the SCG can be deactivated when it does not transmit data; correspondingly, after the deactivation, the user does not need to monitor a downlink control channel of the SCG, thus saving energy consumption of the UE.

SUMMARY

When an RLF occurs in an MCG, and if certain conditions are met, a link can be recovered through an SCG without triggering a Radio Resource Control (RRC) connection re-establishment. After introducing an activation/deactivation mechanism of the SCG, it is necessary to enhance the way to support rapid recovery of the MCG when the SCG is in a deactivated state.

To address the above problem, the present disclosure provides a solution. In the statement above, the scenario of Terrestrial Network (TN) communications is taken as an example; the present disclosure is also applicable to other scenarios, such as Non-Terrestrial Network (NTN) transmission, where similar technical effects can be achieved. Additionally, the adoption of a unified solution for various scenarios contributes to the reduction of hardware complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
  determining that an RLF occurs in a first cell; and
  when a second cell is in a first state, as a response to determining that the RLF occurs in the first cell, determining that the second cell enters into a third state, and transmitting a first message; when the second cell is in a second state, as a response to determining that the RLF occurs in the first cell, transmitting a second message; when the second cell is in a third state, as a response to determining that the RLF occurs in the first cell, transmitting the first message;
  herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, a problem to be solved in the present disclosure includes when the RLF occurs in the first cell and if the second cell is in a dormancy state, whether a link recovery of the first cell can be carried out through the second cell.

In one embodiment, a problem to be solved in the present disclosure includes when the RLF occurs in the first cell and the second cell is in a dormancy state, how to activate the second cell.

In one embodiment, a problem to be solved in the present disclosure includes when the RLF occurs in the first cell and if the second cell is in a dormancy state, whether an MCG Failure Information procedure can be performed.

In one embodiment, a problem to be solved in the present disclosure includes when the RLF occurs in the first cell and if the second cell is in a dormancy state, how to avoid an RRC connection re-establishment.

In one embodiment, characteristics of the above method include: when the RLF occurs in the first cell and if the second cell is in a dormancy state, the second cell is activated first and then an MCG Failure Information procedure is performed.

In one embodiment, characteristics of the above method include a UE activates the second cell from a dormancy state.

In one embodiment, advantages of the above method include improving reliability.

In one embodiment, advantages of the above method include improving robustness.

In one embodiment, advantages of the above method include avoiding triggering an RRC connection re-establishment.

According to one aspect of the present disclosure, wherein the behavior of determining that the second cell enters into a third state comprises recovering a radio bearer with the second cell.

According to one aspect of the present disclosure, wherein the behavior of determining that the second cell enters into a third state comprises:
transmitting a first radio signal;
herein, the first radio signal is used to trigger the second cell to enter into the third state.

According to one aspect of the present disclosure, wherein the behavior of determining that the second cell enters into a third state comprises:
receiving a second radio signal;
herein, the second radio signal is used to trigger the second cell to enter into the third state.

According to one aspect of the present disclosure, comprising:
receiving a first signaling;
herein, the first signaling is used to indicate the second cell to enter into the first state.

According to one aspect of the present disclosure, comprising:
receiving a second signaling; and
when a first condition set is satisfied, starting a first timer; when the first timer is running, switching the second cell to the third state, and stopping the first timer; when the first timer is expired, initiating an RRC connection re-establishment procedure;
herein, the second signaling comprises a first expiration value, and the first expiration value is used to determine a maximum running time of the first timer.

According to one aspect of the present disclosure, comprising:
receiving a third signaling;
herein, the third signaling is used to indicate whether the second cell enters into the third state from the first state.

The present disclosure provides a method in a second-type node for wireless communications, comprising:
when a second cell is in a first state, as a response that an RLF occurs in a first cell is determined, determining that the second cell enters into a third state, and receiving a first message; when the second cell is in a second state, as a response that an RLF occurs in a first cell is determined, receiving a second message; when the second cell is in a third state, as a response that an RLF occurs in a first cell is determined, receiving the first message;
herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

According to one aspect of the present disclosure, wherein the behavior of determining that the second cell enters into a third state comprises recovering a radio bearer between a transmitter of the first message and the second cell.

According to one aspect of the present disclosure, wherein the behavior of determining that the second cell enters into a third state comprises:
receiving a first radio signal;
herein, the first radio signal is used to trigger the second cell to enter into the third state.

According to one aspect of the present disclosure, wherein the behavior of determining that the second cell enters into a third state comprises:
transmitting a second radio signal;
herein, the second radio signal is used to trigger the second cell to enter into the third state.

According to one aspect of the present disclosure, comprising:
transmitting a first signaling;
herein, the first signaling is used to indicate the second cell to enter into the first state.

According to one aspect of the present disclosure, comprising:
transmitting a second signaling;
herein, the second signaling comprises a first expiration value, and the first expiration value is used to determine a maximum running time of the first timer; when a first condition set is satisfied, a first timer is started; when the first timer is running, the second cell is switched to the second state, and the first timer is stopped; when the first timer is expired, an RRC connection re-establishment procedure is initiated.

According to one aspect of the present disclosure, comprising:
transmitting a third signaling;
herein, the third signaling is used to indicate whether the second cell enters into the third state from the first state.

The present disclosure provides a first node for wireless communications, comprising:
a first receiver, determining that an RLF occurs in a first cell;
a first transmitter, when a second cell is in a first state, as a response to determining that the RLF occurs in the first cell, determining that the second cell enters into a third state, and transmitting a first message; when the second cell is in a second state, as a response to determining that the RLF occurs in the first cell, transmitting a second message; when the second cell is in a third state, as a response to determining that the RLF occurs in the first cell, transmitting the first message;
herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

The present disclosure provides a second-type node for wireless communications, comprising:
a second-type receiver, when a second cell is in a first state, as a response that a first cell is determined to have an RLF, determining that the second cell enters into a third state, and receiving a first message; when the second cell is in a second state, as a response that a first cell is determined to have an RLF, receiving a second message; when the second cell is in a third state, as a response that a first cell is determined to have an RLF, receiving the first message;

herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, the present disclosure has the following advantages over conventional schemes:

reliability is improved;
robustness is increased;
triggering an RRC connection re-establishment is avoided.

Inventors find through researches that, after the SCG is deactivated, there is no solution on how to activate the SCG when there is uplink data in UE to be transmitted.

To address the above problem, the present disclosure provides a solution. It should be noted that though the present disclosure only took the communication scenarios between the network devices and the terminals for example in the statement above, it is also applicable to other scenarios, including terminal-to-terminal communication scenarios, where similar technical effects can be achieved. Additionally, the adoption of a unified solution for various scenarios, including but not limited to communications between network devices and terminals as well as communication scenarios from terminals to terminals, contributes to the reduction of hardware complexity and costs. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in IEEE protocol specifications.

The present disclosure provides a method in a first node for wireless communications, comprising:

generating first information, the first information indicating a buffer state of a first serving cell group; and
when the first serving cell group is in an active state, transmitting the first information through the first serving cell group; when the first serving cell group is in an inactive state, transmitting the first information through the second serving cell group;
herein, the first serving cell group and the second serving cell group are respectively an SCG and an MCG.

In one embodiment, when there is data to be transmitted in a first MAC entity, the first information is generated.

In one embodiment, the first MAC entity corresponds to an RB between the first node and a first serving cell group to which it belongs.

In one embodiment, the first MAC entity corresponds to a first serving cell group.

In one embodiment, the first information is transmitted through an RRC signaling.

In one embodiment, the first information is transmitted through a MAC Control Element (CE).

In one embodiment, the phrase of the first serving cell being in an active state includes monitoring a control signaling of the first serving cell group.

In one embodiment, the phrase of the first serving cell being in an inactive state includes stopping monitoring a control signaling of the first serving cell group.

In one subembodiment of the above embodiment, a control signaling of the first serving cell group comprises at least one of Downlink Control Information (DCI), a MAC CE or an RRC signaling.

In one subembodiment of the above embodiment, the phrase of monitoring a control signaling of the first serving cell group includes monitoring a control signaling of the first serving cell group.

In one subembodiment of the above embodiment, the phrase of monitoring a control signaling of the first serving cell group includes detecting whether there exists the control signaling on a channel occupied by a control signaling of the first serving cell group.

In one subembodiment of the above embodiment, the monitoring includes a blind detection.

In one subembodiment of the above embodiment, the monitoring includes a coherent detection of a characteristic sequence.

In one subembodiment of the above embodiment, the monitoring includes a Cyclic Redundancy Check (CRC).

In one embodiment, the first information transmitted through the second serving cell group is received by a second node; and the first information transmitted by the first serving cell group is received by a third node.

In one embodiment, the third node comprises a Secondary Node (SN).

In one embodiment, the second node comprises a Master Node (MN).

Specifically, according to one aspect of the present disclosure, the above method is characterized in comprising:

monitoring a first signaling on the second serving cell group; when the first signaling is detected, starting monitoring a control signaling of the first serving cell group;
herein, the first serving cell group is in an inactive state; and the first information is used to trigger the first signaling.

In one embodiment, the first signaling is used to recover an active state of the first serving cell group.

In one embodiment, after the first signaling is detected, the first serving cell group is in an active state.

In one embodiment, after the first signaling is processed, the first serving cell group is in an active state.

Specifically, according to one aspect of the present disclosure, the above method is characterized in comprising:

when the first signaling is not detected in a first time window, transmitting a second SR in the first serving cell group; and
receiving a second signaling on the first serving cell group, the second signaling indicating configuration information of a second channel;

herein, a start position of the first time window depends on time-domain resources occupied by the first information; and the first information is used to trigger the second SR.

In one embodiment, the second SR is used to trigger the second signaling.

In one embodiment, configuration information of the second channel comprises radio resources occupied by a second channel.

In one subembodiment of the above embodiment, radio resources occupied by the second channel comprise time-domain resources occupied by the second channel.

In one subembodiment of the above embodiment, radio resources occupied by the second channel comprise frequency-domain resources occupied by the second channel.

In one subembodiment of the above embodiment, radio resources occupied by the second channel comprise multi-access signatures occupied by the second channel.

Specifically, according to one aspect of the present disclosure, the above method is characterized in comprising:
 transmitting a first SR on the second serving cell group; and
 receiving a third signaling on the second serving cell group, the third signaling indicating configuration information of a first channel;
 herein, the first serving cell group is in an inactive state;
 the first information is used to trigger the first SR;
 the first information is transmitted on the first channel;
 radio resources occupied by the first SR are used to determine whether a buffer state indicated by the first information is for the first serving cell group or the second serving cell group.

In one embodiment, the first SR is used to trigger the third signaling.

In one embodiment, configuration information of the first channel comprises radio resources occupied by a first channel.

In one subembodiment of the above embodiment, radio resources occupied by the first channel comprise time-domain resources occupied by a first channel.

In one subembodiment of the above embodiment, radio resources occupied by the first channel comprise frequency-domain resources occupied by a first channel.

In one subembodiment of the above embodiment, radio resources occupied by the first channel comprise multi-access signatures occupied by a first channel.

The present disclosure provides a first node for wireless communications, comprising:
 a first receiver, generating first information, the first information indicating a buffer state of a first serving cell group; and
 a first transmitter, when the first serving cell group is in an active state, transmitting the first information through the first serving cell group; when the first serving cell group is in an inactive state, transmitting the first information through the second serving cell group;
 herein, the first serving cell group and the second serving cell group are respectively an SCG and an MCG.

The present disclosure provides a method in a second node for wireless communications, comprising:
 receiving first information through a second serving cell group;
 herein, the first information indicates a buffer state of a first serving cell group; the first serving cell group is in an inactive state; when the first serving cell group is in an active state, the first information is transmitted through the first serving cell group; the first serving cell group and the second serving cell group are respectively an SCG and an MCG.

The present disclosure provides a second node for wireless communications, comprising:
 a second receiver, receiving first information through a second serving cell group;
 herein, the first information indicates a buffer state of a first serving cell group; the first serving cell group is in an inactive state; when the first serving cell group is in an active state, the first information is transmitted through the first serving cell group; the first serving cell group and the second serving cell group are respectively an SCG and an MCG.

In one embodiment, the present disclosure is advantageous in the following aspects: a first cell group is activated through an immediate transmission buffer state of an MCG in an activate state, thus reducing time delay of data transmission on a first cell group SCG.

BRIEF DESCRIPTION OF THE DRAWINGS

Other features, objects and advantages of the present disclosure will become more apparent from the detailed description of non-restrictive embodiments taken in conjunction with the following drawings:

FIG. 8B illustrates a structure block diagram of a processing device in a second node according to one embodiment of the present disclosure.

FIG. 9 illustrates a schematic diagram of behaviors of a first node when a second cell is in different states according to one embodiment of the present disclosure.

FIG. 10 illustrates a schematic diagram of a first field being used to indicate a cause for transmitting a first radio signal according to one embodiment of the present disclosure.

FIG. 11 illustrates a schematic diagram of a first bitmap being used to indicate a state of a second cell according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figures 1A, 1B, 2:
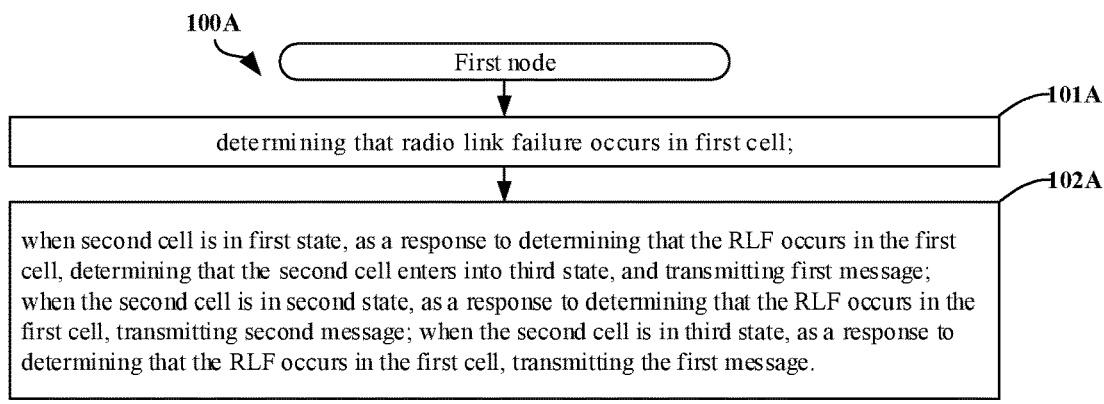
FIG. 1A illustrates a flowchart of transmission of a first massage and a second message according to one embodiment of the present disclosure.
FIG. 1B illustrates a flowchart of the processing of a first node according to one embodiment of the present disclosure.
FIG. 2 illustrates a schematic diagram of a network architecture according to one embodiment of the present disclosure.

Embodiment 1A illustrates a schematic diagram of transmission of a first message and a second message according to one embodiment of the present disclosure, as shown in FIG. 1A. In FIG. 1A, each box represents a step. It should be noted particularly that the order in which the boxes are arranged does not imply a chronological sequence of each step respectively marked.

In Embodiment 1A, a first node in the present disclosure determines that an RLF occurs in a first cell in step 101A; when a second cell is in a first state in step 102A, as a response to determining that the RLF occurs in the first cell, determines that the second cell enters into a third state, and transmits a first message; when the second cell is in a second state, as a response to determining that the RLF occurs in the first cell, transmits a second message; when the second cell is in a third state, as a response to determining that the RLF occurs in the first cell, transmits the first message; herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, the action of determining that an RLF occurs in a first cell includes determining an RLF between the first node and the first cell.

In one embodiment, the action of determining that an RLF occurs in a first cell includes assuming that the RLF is detected for the first cell.

In one embodiment, the RLF comprises an RLF.

In one embodiment, the RLF comprises a Handover Failure (HOF).

In one subembodiment of the above embodiment, the Handover failure comprises a Conditional Handover (CHO) failure.

In one subembodiment of the above embodiment, the Handover failure comprises a Conventional handover failure.

In one subembodiment of the above embodiment, the Handover failure comprises a Dual Active Protocol Stack (DAPS) handover failure.

In one embodiment, when the action is determining that an RLF occurs in a first cell, a DAPS bearer is not configured.

In one embodiment, the first node determines the RLF according to wireless measurement.

In one subembodiment of the above embodiment, the wireless measurement is for the first cell.

In one subembodiment of the above embodiment, the wireless measurement includes performing measurement on at least one of a Synchronization Signal, a Cell-specific Reference Signal (CRS), a Synchronization Signal Reference Signal (SS-RS), a Synchronization Signal Block (SSB), a Primary Synchronization Signal, a Secondary Synchronization Signal (SSS), a Synchronization Signal/Physical Broadcast Channel (SS/PBCH) block, a Channel State Information Reference Signal (CSI-RS) or a Physical Downlink Control Channel (PDCCH).

In one embodiment, when timer T310 in the first cell expires, it is determined that the RLF occurs in the first cell.

In one embodiment, when timer T312 in the first cell expires, it is determined that the RLF occurs in the first cell.

In one embodiment, when a problem indication of Random Access (RA) from a MCG Medium Access Control (MAC) is received, and timers T300, T301, T304, T311 and T319 are not running, it is determined that the RLF occurs in the first cell.

In one embodiment, when an indication of reaching a maximum number of retransmissions from MCG Radio Link Control (RLC) is received, it is determined that the RLF occurs in the first cell.

In one embodiment, if it is connected as an Integrated Access and Backhaul (IAB) node, when a BAP entity receives a BH RLF indication from an MCG, it is determined that the RLF occurs in the first cell.

In one embodiment, when Timer T304 is not running and consecutive uplink Listen Before Talk (LBT) failure indications of MCG MAC are received, it is determined that the RLF occurs in the first cell.

In one embodiment, when timer T304 expires, it is determined that the RLF occurs in the first cell.

In one embodiment, when an indication of reaching a maximum number of retransmissions of a Signaling Radio Bearer (SRB) or a Data Radio Bearer (DRB) is received from an MCG Radio Link Control (RLC), it is determined that an RLF occurs in the first cell.

In one embodiment, when a problem indication of an RA is received from an MCG MAC, and none of timers T300, T301, T304 and T311 is running, it is determined that an RLF occurs in the first serving cell.

In one embodiment, the first cell comprises a Serving Cell.

In one embodiment, the first cell comprises a Special Cell (SPCell).

In one subembodiment of the above embodiment, the SPCell comprises a Primary Cell (PCell).

In one subsidiary embodiment of the above subembodiment, the PCell comprises an MCG.

In one subsidiary embodiment of the above subembodiment, a maintenance base station of the PCell comprises a Master Node (MN).

In one subembodiment of the above embodiment, the SPCell comprises a Primary SCG Cell (PSCell).

In one subsidiary embodiment of the above subembodiment, the PSCell comprises a Secondary Cell Group (SCG).

In one subsidiary embodiment of the above subembodiment, a maintenance base station of the PCell comprises a Secondary Node (SN).

In one embodiment, the first cell comprises an SCell.

In one embodiment, the first cell does not comprise an SCell.

In one embodiment, the first cell is a cell in an MCG.

In one embodiment, the second cell comprises a serving cell.

In one embodiment, the second cell comprises an SPCell.

In one embodiment, the second cell comprises an SCell.

In one embodiment, the second cell does not comprise an SCell.

In one embodiment, the second cell is a cell in an SCG.

In one embodiment, the first cell comprises an MCG, and the second cell comprises an SCG.

In one embodiment, the first cell comprises a PCell, and the second cell comprises a PSCell.

In one embodiment, the first cell comprises an SCG, and the second cell comprises an MCG.

In one embodiment, the first cell comprises a PSCell, and the second cell comprises a PCell.

In one embodiment, the first cell and the second cell are both serving cells of the first node.

In one embodiment, the first node maintains connection with the first cell and the second cell through dual connection.

In one embodiment, the first state is for the second cell.

In one embodiment, the first state is for a cell group in which the second cell is located, and the cell group comprises an SCG or an MCG.

In one embodiment, the first state comprises a Dormancy state.

In one embodiment, the first state comprises a Deep Dormancy state.

In one embodiment, the first state comprises a Discontinuous Reception (DRX) state.

In one embodiment, the first state comprises a deactivated state.

In one embodiment, the first state comprises an inactivated state.

In one embodiment, the first state comprises a suspended state.

In one subembodiment of the above embodiment, the meaning of suspended includes paused.

In one subembodiment of the above embodiment, the meaning of suspended includes suspended.

In one embodiment, the first state comprises an SCG deactivation state.

In one embodiment, the first state comprises an SCG inactivation state.

In one embodiment, the first state comprises an SCG dormant state.

In one embodiment, the first state comprises an SCG suspended state.

In one embodiment, the first state comprises an RRC_INACTIVATE state.

In one embodiment, when a second cell is in a first state, the first node does not monitor a PDCCH for the second cell.

In one embodiment, when a second cell is in a first state, the first node performs a measurement for a Radio Link Monitor (RLM) of the second cell.

In one embodiment, the first state comprises that an RLF does not occur in the second cell.

In one embodiment, the first state comprises that an RLF is not detected in an SCG.

In one embodiment, the first state comprises that a reconfiguration with sync failure does not occur in an SCG.

In one embodiment, the first state comprises that a configuration failure does not occur in an SCG.

In one embodiment, the first state comprises that an integrity check failure indication from lower layers on SRB3 occurs in SCG.

In one embodiment, the first state belongs to a CM_CONNECTED state.

In one embodiment, the first cell belongs to an RRC_CONNECTED state.

In one embodiment, when a second cell is in a first state, the first cell is in an RRC_CONNECTED state.

In one embodiment, when the second node of the first node is in the first state, the behavior of the first node comprises several first-type behaviors.

In one subembodiment of the above embodiment, the first-type behavior comprises not monitoring a PDCCH for the second cell.

In one subembodiment of the above embodiment, the first-type behavior comprises not performing an uplink transmission for the second cell.

In one subembodiment of the above embodiment, the first-type behavior comprises not performing CSI measurement for the second cell.

In one subembodiment of the above embodiment, the first-type behavior comprises not reporting CSI of the second cell.

In one subembodiment of the above embodiment, the first-type behavior comprises reserving an RRC configuration for the second cell.

In one subembodiment of the above embodiment, the first-type behavior comprises performing an RLM measurement for the second cell.

In one subembodiment of the above embodiment, the first-type behavior comprises performing a CSI measurement for the second cell.

In one subembodiment of the above embodiment, the first-type behavior comprises performing a Radio Resource Management measurement for the second cell.

In one subembodiment of the above embodiment, the first-type behavior comprises suspending an SRB for the second cell.

In one subembodiment of the above embodiment, the first-type behavior comprises suspending a DRB for the second cell.

In one subembodiment of the above embodiment, the first-type behavior comprises continuing to perform a Beam Management (BM) for the second cell.

In one subembodiment of the above embodiment, the first-type behavior comprises not performing an RA in the second cell.

In one subembodiment of the above embodiment, the first-type behavior comprises that an RA can be performed in the second cell.

In one subembodiment of the above embodiment, the first-type behavior comprises not transmitting a Sounding Reference Signal (SRS) in the second cell.

In one subembodiment of the above embodiment, the first-type behavior comprises not transmitting an Uplink Shared CHannel (UL-SCH) in the second cell.

In one subembodiment of the above embodiment, the first-type behavior comprises not transmitting a Physical Uplink Control Channel (PUCCH) in the second cell.

In one subembodiment of the above embodiment, the several first-type behaviors comprise T1 first-type behavior(s), T1 being a positive integer.

In one subembodiment of the above embodiment, the several first-type behaviors comprise all the first-type behaviors in the present disclosure.

In one subembodiment of the above embodiment, the several first-type behaviors comprise partial the first-type behaviors in the present disclosure.

In one embodiment, when the second cell is in the first state, the first node performs a channel measurement in the second cell.

In one subembodiment of the above embodiment, the channel measurement comprises a Reference Signal Received Power (RSRP) measurement.

In one subembodiment of the above embodiment, the channel measurement comprises a Reference Signal Received Quality (RSRQ) measurement.

In one subembodiment of the above embodiment, the channel measurement comprises a Signal to Interference plus Noise Ratio (SINR) measurement.

In one subembodiment of the above embodiment, the channel measurement comprises a Channel State Information (CSI) measurement.

In one subembodiment of the above embodiment, the channel measurement comprises a downlink synchronization measurement.

In one embodiment, the phrase of as a response to determining that the RLF occurs in the first cell includes a time when the RLF occurs in the first cell.

In one embodiment, the phrase of as a response to determining that the RLF occurs in the first cell includes as a next action of determining that the RLF occurs in the first cell.

In one embodiment, the phrase of as a response to determining that the RLF occurs in the first cell includes as a feedback of determining that the RLF occurs in the first cell.

In one embodiment, the action of determining that the second cell enters into a third state comprises switching the second cell from the first state to the third state.

In one embodiment, the action of determining that the second cell enters into a third state comprises judging that the second cell satisfies a condition for the second cell to enter into the third state.

In one embodiment, the third state is for the second cell.

In one embodiment, the third state is for a cell group where the second cell is located.

In one embodiment, the third state comprises a normal PSCell operation.

In one embodiment, the third state comprises a connected state.

In one embodiment, the third state comprises an active state.

In one embodiment, the third state is not a DRX state.

In one embodiment, the third state comprises an active state.

In one embodiment, the third state is not a suspended state.

In one embodiment, when the second cell is in the third state, the first node transmits an SRS in the second cell.

In one embodiment, when the second cell is in the third state, the first node reports CSI for the second cell.

In one embodiment, when the second cell is in the third state, the first node monitors a PDCCH on the second cell.

In one embodiment, when the second cell is in the third state, the first node monitors a PDCCH for the second cell.

In one embodiment, when the second cell is in the third state, and if a PDCCH for the second cell is configured, the first node transmits a PUCCH in the second cell.

In one embodiment, the third state comprises that all SRBs and all DRBs in the second cell are not suspended.

In one embodiment, the third state comprises that all SRBs and all DRBs in the second cell are not suspended.

In one embodiment, the third state comprises that an SRB of the second cell is available.

In one embodiment, the third state comprises that an SRB of the second cell is established.

In one embodiment, the third state comprises that an SRB of the second cell is recovered.

In one embodiment, the third state comprises that a DRB of the second cell is recovered.

In one embodiment, the third state includes that a PSCell change is not ongoing.

In one embodiment, the third state comprises that timer T304 of the second cell is not ongoing.

In one embodiment, the third state comprises that timer T307 of the second cell is not ongoing.

In one embodiment, the third state comprises that an RLF is not detected in an SCG.

In one embodiment, the third state comprises that a reconfiguration with sync failure does not occur in an SCG.

In one embodiment, the third state comprises that a configuration failure does not occur in an SCG.

In one embodiment, the third state comprises that an integrity check failure indication from lower layers on SRB3 does not occur in SCG.

In one embodiment, the third state comprises performing a PSCell change.

In one embodiment, the phrase of the first message being used for a radio link recovery includes: the first message is used to initiate the radio link recovery.

In one embodiment, the phrase of the first message being used for radio link recovery includes: the first message is used to determine performing the radio link recovery procedure.

In one embodiment, the phrase of the first message being used for radio link recovery includes when performing the radio link recovery is determined, transmitting the first message.

In one embodiment, the radio link recovery comprises a CHO.

In one embodiment, the radio link recovery comprises recovering an MCG link through an SCG.

In one embodiment, the radio link recovery comprises a MCG Failure Information procedure.

In one embodiment, the radio link recovery comprises recovering an RRC connection of an MCG.

In one embodiment, a receiver of the second message comprises a maintenance base station of the second cell.

In one embodiment, the first message is transmitted via an air interface.

In one embodiment, the first message is transmitted via a radio interface.

In one embodiment, the first message is transmitted through a higher-layer signaling.

In one embodiment, the first message comprises a higher-layer signaling.

In one embodiment, the first message comprises all or part of a higher layer signaling.

In one embodiment, the first message comprises an RRC message.

In one embodiment, the first message comprises all or partial IEs in an RRC Message.

In one embodiment, the first message comprises all or part of fields of an IE in an RRC message.

In one embodiment, the first message comprises an uplink signaling.

In one embodiment, a Signaling Radio Bearer of the first message comprises SRB1.

In one embodiment, a Signaling Radio Bearer of the first message comprises SRB3.

In one embodiment, a logical channel bearing the first message comprises a Dedicated Control Channel (DCCH).

In one embodiment, the first message comprises an MCGFailureInformation message.

In one embodiment, the first message comprises a FailureInformation2 message.

In one embodiment, the first message comprises an MCGFailureInformationEUTRA message.

In one embodiment, the first message comprises an MCGFailureInformationNR message.

In one embodiment, the first message comprises an SCGFailureInformation message.

In one embodiment, the first message comprises an SCGFailureInformationNR message.

In one embodiment, the first message comprises an SCGFailureInformationEUTRA message.

In one embodiment, the first message comprises a SidelinkUEInformation message.

In one embodiment, the first message comprises a SidelinkUEInformationNR message.

In one embodiment, the first message comprises a SidelinkUEInformationEUTRA message.

In one embodiment, the first message comprises a FailureInformation message.

In one embodiment, the first message comprises a ULInformationTransferMRDC message.

In one embodiment, the first message comprises a measurement report.

In one embodiment, the first message comprises a ULInformationTransferMRDC message, and the ULInformationTransferMRDC message comprises an MCGFailureInformation message.

In one embodiment, the first message comprises an MCGFailureInformation message, and the MCGFailureInformation message is transmitted through SRB1.

In one embodiment, the first message comprises a ULInformationTransferMRDC message, and the ULInformationTransferMRDC message is transmitted through SRB3.

In one embodiment, the first message is transmitted after the behavior of determining that the second cell enters into a third state.

In one embodiment, the first message is transmitted in the procedure of the behavior of determining that the second cell enters into a third state.

In one embodiment, the first message is transmitted on the second cell.

In one embodiment, the first message is transmitted in a cell in an SCG, and the SCG comprises the second cell.

In one embodiment, the second state is for the second cell.

In one embodiment, the second state comprises an RLF.

In one embodiment, the second state comprises an SCG suspended state.

In one embodiment, the second state comprises that the RLF occurs in the second cell.

In one embodiment, the second state comprises that a cell group where the second group is located is suspended.

In one embodiment, the second state comprises a reconfiguration with sync failure in a cell group where the second cell is located.

In one embodiment, the second state comprises a change failure in a cell group where the second cell is located.

In one embodiment, the second state comprises a configuration failure in a cell group where the second group is located.

In one embodiment, the second state comprises receiving an integrity check failure indication from lower layers on SRB3 in a cell group where the second cell is located.

In one embodiment, the second state comprises that the second cell is performing a change of a PSCell.

In one embodiment, in the second state, all SRB(s) and DRB(s) in the second cell are all suspended.

In one embodiment, in the second state, a MAC in the second cell is reconfigured.

In one embodiment, in the second state, timer T304 in the second cell is stopped.

In one embodiment, in the second state, if a Conditional PSCell Change (CPC) is configured, a CPC condition reconfiguration estimation is stopped.

In one embodiment, when the second cell is in the second state, the first node does not perform the channel measurement in the second cell.

In one embodiment, the phrase of the second message being used for radio connection re-establishment includes: the second message is used to request an RRC connection re-establishment.

In one embodiment, the phrase of the second message being used for radio connection re-establishment includes: the second signal is used to initiate a radio connection re-establishment.

In one embodiment, the phrase of the second message being used for radio connection re-establishment includes: the second message is transmitted in the connection re-establishment procedure.

In one embodiment, the phrase of the second message being used for radio connection re-establishment includes: when performing the radio connection re-establishment is determined, the second message is transmitted.

In one embodiment, a receiver of the second message comprises a first base station.

In one subembodiment of the above embodiment, the first node performs a cell selection to determine the first base station.

In one subembodiment of the above embodiment, the first base station is the same as a maintenance base station of the first cell.

In one subembodiment of the above embodiment, the first base station is different from a maintenance base station of the first cell.

In one subembodiment of the above embodiment, the first base station is the same as a maintenance base station of the second cell.

In one subembodiment of the above embodiment, the first base station is different from a maintenance base station of the second cell.

In one embodiment, the second message is transmitted via an air interface.

In one embodiment, the second message is transmitted via a wireless interface.

In one embodiment, the second message is transmitted through a higher layer signaling.

In one embodiment, the second message comprises a higher layer signaling.

In one embodiment, the second message comprises all or part of a higher layer signaling.

In one embodiment, the second message comprises an RRC message.

In one embodiment, the second message comprises all or partial IEs in an RRC message.

In one embodiment, the second message comprises all or partial fields of an IE in an RRC message.

In one embodiment, the second message comprises an uplink signaling.

In one embodiment, a Signaling Radio Bearer of the second message comprises SRB0.

In one embodiment, a logical channel bearing the second message comprises a Common Control Channel (CCCH).

In one embodiment, the second message comprises an RRCRe-establishmentRequest message.

In one embodiment, the second message comprises an RRCConnectionRe-establishmentRequest message.

In one embodiment, the phrase of the first node not monitoring a control signaling on the second cell includes: the first node does not monitor the control signaling for the second cell.

In one embodiment, the phrase of the first node not monitoring a control signaling on the second cell includes: the first node does not monitor the control signaling transmitted by the second cell.

In one embodiment, the phrase of the first node monitoring the control signaling on the second cell includes: the first node monitors the control signaling for the second cell.

In one embodiment, the phrase of the first node monitoring the control signaling on the second cell includes: the first node monitors the control signaling transmitted by the second cell.

In one embodiment, the monitoring a control signaling includes monitoring the control signaling.

In one embodiment, the monitoring a control signaling includes detecting whether there exists the control signaling on a channel occupied by the control signaling.

In one embodiment, the monitoring includes a Cyclic Redundancy Check (CRC).

In one embodiment, the monitoring includes a blind detection.

In one embodiment, the monitoring includes a coherent detection of a characteristic sequence.

In one embodiment, the control signaling comprises DCI.

In one embodiment, the control signaling comprises UCI.

In one embodiment, the control signaling comprises a PDCCH.

In one embodiment, the control signaling comprises a PUCCH.

In one embodiment, a channel occupied by the control signaling comprises a PDCCH.

In one embodiment, a channel occupied by the control signaling comprises a PUCCH.

In one embodiment, it is determined that an RLF occurs in a first cell is determined; when a second cell is in a first state and the first condition set is satisfied, as a response to determining that the RLF occurs in the first cell, it is determined that the second cell enters into a third state, and a first message is transmitted.

In one embodiment, the first condition set comprises M1 first-type condition(s), M1 being a positive integer.

In one subembodiment of the above embodiment, the first-type condition includes that the third signaling indicates the second cell to enter into the third state from the first state.

In one subembodiment of the above embodiment, the first-type condition includes that the third signaling indicates that the first node possesses an ability to switch the second cell from the first state to the third state.

In one subembodiment of the above embodiment, the first node determines to switch the second cell from the first state to the third state.

In one subembodiment of the above embodiment, the first-type condition includes that the second cell is in the first state.

In one subembodiment of the above embodiment, the first-type condition includes that the RLF occurs in the first cell.

In one subembodiment of the above embodiment, the first-type condition includes that the first node is configured with split SRB1.

In one subembodiment of the above embodiment, the first-type condition includes that the first node is configured with SRB3.

In one subembodiment of the above embodiment, the first-type condition includes that an MCG is not suspended.

In one subembodiment of the above embodiment, the first-type condition includes that an SCG is not suspended.

In one subembodiment of the above embodiment, the first-type condition includes that a first timer is configured and the first timer is not running.

In one subsidiary embodiment of the above subembodiment, the first timer comprises T316.

In one subsidiary embodiment of the above subembodiment, the first timer comprises T310.

In one subembodiment of the above embodiment, each of the M1 first-type condition(s) being satisfied is used to determine that the first condition set is satisfied.

In one subembodiment of the above embodiment, M2 first-type condition(s) in the M1 first-type condition(s) being satisfied is(are) used to determine that the first condition set is satisfied, M2 being a positive integer not greater than M1.

In one embodiment, the first condition being satisfied includes that the first node can perform an MCG Failure Information procedure, and the second cell is in the first state.

In one embodiment, it is determined that an RLF occurs in a first cell; when a second cell is in a third state and a first condition set is satisfied, as a response to determining that the RLF occurs in the first cell, a first message is transmitted.

In one embodiment, it is determined that an RLF occurs in a first cell; when a second cell is in a second state and a first condition set is not satisfied, as a response to determining that the RLF occurs in the first cell, a second message is transmitted.

In one subembodiment of the above embodiment, the first condition set not being satisfied includes an RLF being detected in an SCG.

In one subembodiment of the above embodiment, the first-type condition set not being satisfied includes that a reconfiguration with sync failure occurs in an SCG.

In one subembodiment of the above embodiment, the first-type condition set not being satisfied includes that a configuration failure occurs in an SCG.

In one subembodiment of the above embodiment, the first-type condition set not being satisfied includes that an integrity check failure indication from lower layers on SRB3 occurs in an SCG.

In one subembodiment of the above embodiment, the first condition set not being satisfied includes performing a PSCell change.

In one embodiment, it is determined that an RLF occurs in a first cell; when a second cell is in a second state, as a response to determining that the RLF occurs in the first cell, a second message is transmitted.

In one embodiment, the second cell is in a given state refers to: the second cell is in a given state for the first node; the given state is the first state, or the second state, or the third state.

In one embodiment, the second cell is in a given state refers to: the second cell of the first node is in the given state; the given state is the first state, or the second state, or the third state.

In one embodiment, the second cell is in a given state refers to: a state of the second cell belongs to the given state; the given state is the first state, or the second state, or the third state.

In one embodiment, the second cell is in a given state refers to: the first node performs a behavior of the given state for the second cell; the given state is the first state, or the second state, or the third state.

In one embodiment, the second cell is in a given state refers to: a behavior of the first node in the first cell is in a given state; the given state is the first state, or the second state, or the third state.

Embodiment 1B

Embodiment 1B illustrates a flowchart of the processing of a first node according to one embodiment of the present disclosure, as shown in FIG. 1. In FIG. 1B, each block represents a step. Particularly, the sequential order of steps in these boxes does not necessarily mean that the steps are chronologically arranged.

In Embodiment 1B, a first node in the present disclosure generates first information in step S101B, the first information indicates a buffer state of a first serving cell group; when the first serving cell is in an active state in step S102B, transmits the first information through the first serving cell group; and when the first serving cell group is in an inactive state in step S103B, transmits the first information through a second serving cell group.

Herein, the first serving cell group and the second serving cell group are respectively an SCG and an MCG.

In one embodiment, the first serving cell group comprises at least one serving cell.

In one embodiment, the second serving cell group comprises at least one serving cell.

In one embodiment, when there is data to be transmitted in a first MAC entity, the first information is generated.

In one embodiment, the first MAC entity corresponds to an RB between the first node and a first serving cell group to which it belongs.

In one embodiment, the first MAC entity corresponds to a first serving cell group.

In one embodiment, the first information is transmitted through an RRC signaling.

In one embodiment, the first information is transmitted through a MAC CE.

In one embodiment, the first information is transmitted through a higher-layer signaling.

In one embodiment, the first information is transmitted through Uplink Control Information (UCI).

In one embodiment, the first information is transmitted through an inner layer signaling.

In one embodiment, the first information is transmitted on Physical Uplink Shared Channel (PUSCH).

In one embodiment, the first information is transmitted on a PUCCH.

In one embodiment, the first information comprises a first logical channel group identity and a first buffer size, and the first buffer size indicates a size of data available to a logical channel group identified by the first logical channel group identity; the first logical channel group identity is allocated to the first serving cell group.

In one embodiment, the first information indicates that there is data to be transmitted for at least one cell in a first serving cell group.

In one embodiment, the first information indicates that there is uplink data to be transmitted for at least one cell in a first serving cell group.

In one embodiment, the first information indicates that there is data to be transmitted for any cell in a first serving cell group.

In one embodiment, the first information indicates that there is uplink data to be transmitted for any cell in a first serving cell group.

In one embodiment, the first information indicates that there is data to be transmitted for a first serving cell group.

In one embodiment, the first information indicates that there is uplink data to be transmitted for a first serving cell group.

In one embodiment, the phrase of the first serving cell being in an active state includes monitoring a control signaling of the first serving cell group.

In one embodiment, the phrase of the first serving cell being in an active state includes transmitting uplink data through the first serving cell group.

In one embodiment, the phrase of the first serving cell being in an active state includes receiving downlink data through the first serving cell group.

In one embodiment, the phrase of the first serving cell being in an active state includes monitoring a control signaling of any cell in the first serving cell group.

In one embodiment, the phrase of the first serving cell being in an active state includes monitoring a control signaling on a PCell in the first serving cell group.

In one embodiment, the phrase of the first serving cell being in an active state includes transmitting uplink data through any cell in the first serving cell group.

In one embodiment, the phrase of the first serving cell being in an active state includes receiving uplink data through any cell in the first serving cell group.

In one embodiment, the phrase of the first serving cell being in an inactive state includes stopping monitoring a control signaling of the first serving cell group.

In one subembodiment of the above embodiment, a control signaling of the first serving cell group comprises at least one of DCI, a MAC CE or an RRC signaling.

In one subembodiment of the above embodiment, the phrase of monitoring a control signaling of the first serving cell group includes monitoring a control signaling of the first serving cell group.

In one subembodiment of the above embodiment, the phrase of monitoring a control signaling of the first serving cell group includes detecting whether there exists the control signaling on a channel occupied by a control signaling of the first serving cell group.

In one subembodiment of the above embodiment, the monitoring includes a blind detection.

In one subembodiment of the above embodiment, the monitoring includes a coherent detection of a characteristic sequence.

In one subembodiment of the above embodiment, the monitoring includes a Cyclic Redundancy Check (CRC).

In one embodiment, the phrase of the first serving cell being in an inactive state includes stopping transmitting uplink data through the first serving cell group.

In one embodiment, the phrase of the first serving cell being in an inactive state includes stopping receiving downlink data through the first serving cell group.

In one embodiment, the phrase of the first serving cell being in an inactive state includes only performing a measurement for any cell in the first serving cell group.

In one embodiment, the phrase of the first serving cell being in an inactive state includes only performing a measurement for a PCell in the first serving cell group.

In one embodiment, the phrase of the first serving cell being in an inactive state includes only monitoring a control signaling of a PCell of the first serving cell group, and only performing measurements on other serving cells of the first serving cell group.

In one embodiment, a first serving cell group is an SCG, and the PCell of the first serving cell group is a PSCell.

In one subembodiment of the above embodiment, the phrase of monitoring a control signaling of the first serving cell group includes monitoring a control signaling of the first serving cell group.

In one subembodiment of the above embodiment, the phrase of monitoring a control signaling of a PCell of the first serving cell group includes detecting whether there exists the control signaling on a channel occupied by a control signaling of a PCell of the first serving cell group.

In one subembodiment of the above embodiment, the monitoring includes a blind detection.

In one subembodiment of the above embodiment, the monitoring includes a coherent detection of a characteristic sequence.

In one subembodiment of the above embodiment, the monitoring includes a Cyclic Redundancy Check (CRC).

In one subembodiment of the above embodiment, a control signaling of a PCell of the first serving cell group comprises at least one of DCI, a MAC CE or an RRC signaling.

In one embodiment, the first information transmitted by the second serving cell group is received by a second node; the first information transmitted by the first serving cell group is received by a third node.

In one embodiment, the first information transmitted by the second serving cell group is received by a second node.

In one embodiment, the first information transmitted by the first serving cell group is received by a third node.

In one embodiment, the third node comprises a Secondary Node (SN).

In one embodiment, the second node comprises a Master Node (MN).

In one embodiment, the phrase of transmitting the first information through the second serving cell group includes transmitting the first information through time-frequency resources configured by a second serving cell group.

In one embodiment, the phrase of transmitting the first information through the second serving cell group includes transmitting the first information through a MAC entity corresponding to the second serving cell.

In one embodiment, the phrase of transmitting the first information through the second serving cell group includes the first information is scrambled by a user identity allocated by a second serving cell group.

In one embodiment, the phrase of transmitting the first information through the second serving cell group includes the first information is scrambled by a cell identity of any serving cell in a second serving cell group.

In one embodiment, a user identity allocated by the second serving cell group is a cell RNTI (C-RNTI).

In one embodiment, a number of bits comprised in a user identity allocated by the second serving cell is a positive integral multiple of 8.

In one embodiment, the phrase of transmitting the first information through the first serving cell group includes transmitting the first information through time-frequency resources configured by a first serving cell group.

In one embodiment, the phrase of transmitting the first information through the second serving cell group includes transmitting the first information through a MAC entity corresponding to the first serving cell.

In one embodiment, the phrase of transmitting the first information through the first serving cell group includes the first information is scrambled by a user identity allocated by a first serving cell group.

In one embodiment, the phrase of transmitting the first information through the first serving cell group includes the first information is scrambled by a cell identity of any serving cell in a first serving cell group.

In one embodiment, a user identity allocated by the first serving cell group is a C-RNTI.

In one embodiment, a number of bits comprised in a user identity allocated by the first serving cell is a positive integral multiple of 8.

In one embodiment, the present disclosure is advantageous in the following aspects: a first cell group is activated by an immediate transmission buffer state of an MCG in an activate state, thus reducing time delay of data transmission on a first cell group SCG.

Embodiment 2

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LIE) and Long-Term Evolution Advanced (LTE-A) systems. The 5G NR or LIE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports NTN communications.

In one embodiment, the UE 201 supports communications within networks with large delay differences.

In one embodiment, the UE 201 supports Terrestrial Networks (TN) communications.

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is a IoT terminal.

In one embodiment, the UE 201 is an Industrial IoT terminal.

In one embodiment, the UE 201 is a device that supports transmission with low-delay and high-reliability.

In one embodiment, the gNB 203 corresponds to the second-type node in the present disclosure.

In one embodiment, the gNB 203 supports communications within NTN.

In one embodiment, the gNB 203 supports communications within networks with large delay differences.

In one embodiment, the gNB 203 supports communications within TN.

In one embodiment, the gNB 203 supports a Uu interface.

In one embodiment, the gNB 203 supports Integrated Access and Backhaul (IAB).

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a UE.

In one embodiment, the gNB 203 is a gateway.

In one embodiment, the UE 201 and the gNB 203 are connected via a Uu interface.

In one embodiment, the gNB 204 and the gNB 203 are connected via an Xn interface.

In one embodiment, the gNB 204 and the gNB 203 are connected via an X2 interface.

In one embodiment, a wireless link between the UE 201 and NR node B is an uplink.

In one embodiment, a wireless link between NR node B and UE 201 is a downlink.

In one embodiment, the first node, the second node and the third node in the present disclosure are respectively the UE 201, the gNB 203 and the gNB 204.

In one embodiment, the UE 201 supports sidelink communications.

In one embodiment, the UE 201 supports a PC5 interface.

In one embodiment, the UE 201 supports a Uu interface.

In one embodiment, the UE 201 supports relay transmission.

In one embodiment, the gNB 204 supports a Uu interface.

In one embodiment, the gNB 204 supports Integrated Access and Backhaul (IAB).

In one embodiment, the gNB 204 is a MarcoCellular base station.

In one embodiment, the gNB 204 is a Micro Cell base station.

In one embodiment, the gNB 204 is a PicoCell base station.

In one embodiment, the gNB 204 is a Femtocell.

In one embodiment, the gNB 204 is a base station that supports large delay differences.

In one embodiment, the gNB 204 is a flight platform.

In one embodiment, the gNB 204 is satellite equipment.

Embodiment 3

Figure 3:
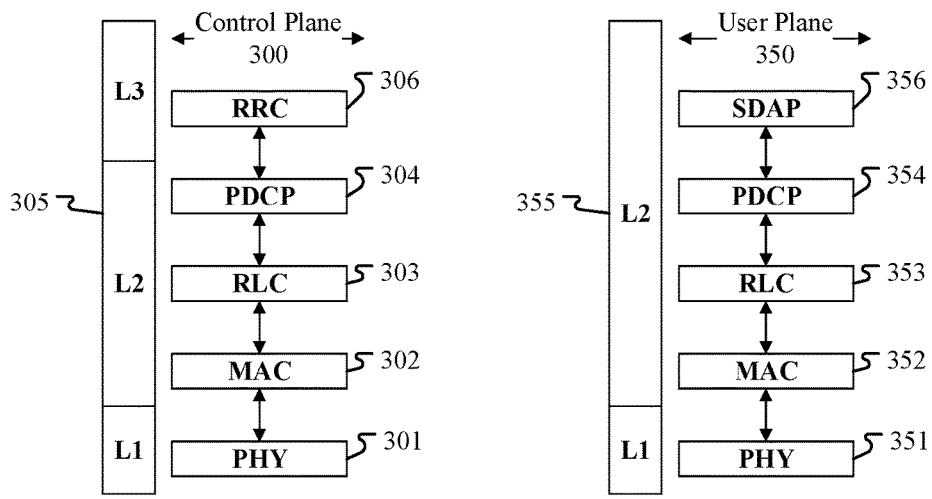
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and DRB to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.). In one embodiment, the radio protocol architecture in FIG. 3 is applicable to the first node in the present disclosure.

In one embodiment, the radio protocol architecture in FIG. 3 is applicable to the second-type node in the present disclosure.

In one embodiment, the first message in the present disclosure is generated by the RRC 306.

In one embodiment, the second message in the present disclosure is generated by the RRC 306.

In one embodiment, the first radio signal in the present disclosure is generated by the RRC 306.

In one embodiment, the first radio signal in the present disclosure is generated by the MAC 302 or the MAC 352.

In one embodiment, the first radio signal in the present disclosure is generated by the PHY 301 or the PHY 351.

In one embodiment, the second radio signal in the present disclosure is generated by the RRC 306.

In one embodiment, the second radio signal in the present disclosure is generated by the MAC 302 or the MAC 352.

In one embodiment, the second radio signal in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the second signaling in the present disclosure is generated by the RRC 306.

In one embodiment, the third signaling in the present disclosure is generated by the RRC 306.

In one embodiment, entities of a plurality of sublayers of the control plane in FIG. 3 form an SRB in the vertical direction.

In one embodiment, entities of multiple sublayers of the control plane in FIG. 3 form a DRB in the vertical direction.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the L2 layer 305 or 355 belongs to a high layer.

In one embodiment, the L3 layer RRC sublayer 306 belongs to a higher layer.

In one embodiment, the PDCP sublayer 354 belongs to a higher layer.

In one embodiment, the SDAP sublayer 356 belongs to a higher layer.

In one embodiment, the L3 layer belongs to a higher layer.

In one embodiment, the behavior of generating first information in the present disclosure is performed on the MAC sublayer 302 or 352.

In one embodiment, the first SR in the present disclosure is generated by the PHY 301 or the 351.

In one embodiment, the first SR in the present disclosure is generated by the MAC sublayer 302 or 352.

In one embodiment, the second SR in the present disclosure is generated by the PHY 301 or the 351.

In one embodiment, the second SR in the present disclosure is generated by the MAC sublayer 302 or 352.

In one embodiment, the second signaling in the present disclosure is generated by the PHY 301 or the 351.

In one embodiment, the second signaling in the present disclosure is generated by the MAC sublayer 302 or 352.

In one embodiment, the third signaling in the present disclosure is generated by the PHY 301 or the 351.

In one embodiment, the third signaling in the present disclosure is generated by the MAC sublayer 302 or 352.

In one embodiment, the fourth signaling in the present disclosure is generated by the RRC 306.

In one embodiment, the fifth signaling in the present disclosure is generated by the RRC 306.

Embodiment 4

Figure 4:
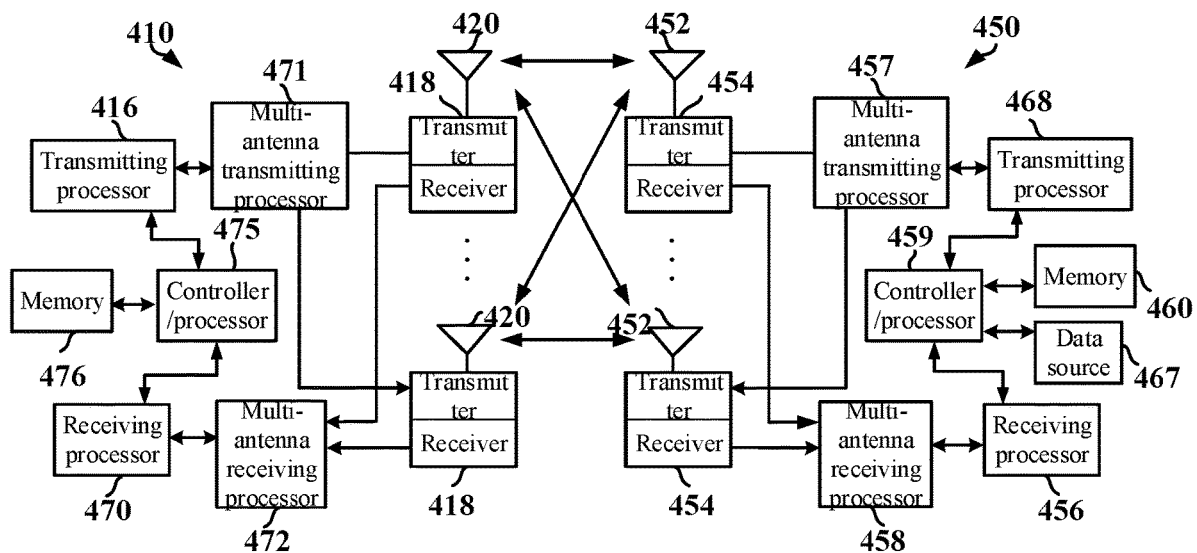
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least determines that an RLF occurs in a first cell; when a second cell is in a first state, as a response to determining that the RLF occurs in the first cell, determines that the second cell enters into a third state, and transmits a first message; when the second cell is in a second state, as a response to determining that the RLF occurs in the first cell, transmits a second message; when the second cell is in a third state, as a response to determining that the RLF occurs in the first cell, transmits the first message; herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, the first communication device 450 comprises at least one processor and at least one memory. a memory that stores a computer readable instruction program. The computer readable instruction program generates an action when executed by at least one processor. The action includes: determining that an RLF occurs in a first cell; when a second cell is in a first state, as a response to determining that the RLF occurs in the first cell, determining that the second cell enters into a third state, and transmitting a first message; when the second cell is in a second state, as a response to determining that the RLF occurs in the first cell, transmitting a second message; when the second cell is in a third state, as a response to determining that the RLF occurs in the first cell, transmitting the first message; herein, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: when a second cell is in a first state, as a response that a first cell is determined to have an RLF, determines that the second cell enters into a third state, and receives a first message; when the second cell is in a third state, as a response that a first cell is determined to have an RLF, receives the first message; herein, the first message is used for a radio link recovery; when the second cell is in the first state, the first node does not monitor a control signaling on the second cell; when the second cell is in the third state, the first node monitors the control signaling on the second cell.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: when the second cell is in a second state, as a response that a first cell is determined to have an RLF, receives a second message; the second message is used for a radio connection re-establishment.

In one embodiment, the second communication device 410 comprises a memory that stores a computer readable instruction program. The computer readable instruction program generates an action when executed by at least one processor. The action includes: when a second cell is in a first state, as a response that a first cell is determined to have an RLF, determining that the second cell enters into a third state, and receiving a first message; when the second cell is in a third state, as a response that a first cell is determined to have an RLF, receiving the first message; herein, the first message is used for a radio link recovery; when the second cell is in the first state, the first node does not monitor a control signaling on the second cell; when the second cell is in the third state, the first node monitors the control signaling on the second cell.

In one embodiment, the second communication device 410 comprises a memory that stores a computer readable instruction program. The computer readable instruction program generates an action when executed by at least one processor. The action includes: the at least one memory and the computer program codes are configured to be used in collaboration with the at least one processor. The second communication device 410 at least: when the second cell is in a second state, as a response that a first cell is determined to have an RLF, receives a second message; and the second message is used for a radio connection re-establishment.

In one embodiment, the antenna 452, the transmitter 454, the transmitting processor 468, and the controller/processor 459 are used to transmit a first message; at least one of the antenna 420, the receiver 418, the receiving processor 470, or the controller/processor 475 is used to receive a first message.

In one embodiment, the antenna 452, the transmitter 454, the transmitting processor 468, and the controller/processor 459 are used to transmit a second message; at least one of the antenna 420, the receiver 418, the receiving processor 470, or the controller/processor 475 is used to receive a second message.

In one embodiment, the antenna 452, the transmitter 454, the transmitting processor 468, and the controller/processor 459 are used to transmit a first radio signal; at least one of the antenna 420, the receiver 418, the receiving processor 470, or the controller/processor 475 is used to receive a first radio signal.

In one embodiment, the antenna 452, the receiver 454, the receiving processor 456, and the controller/processor 459 are used to receive a second radio signal; at least one of the antenna 420, the transmitter 418, the transmitting processor 416, or the controller/processor 475 is used to transmit a second radio signal.

In one embodiment, the antenna 452, the receiver 454, the receiving processor 456, the controller/processor 459 are used to receive a first signaling; at least one of the antenna 420, the transmitter 418, the transmitting processor 416, or the controller/processor 475 is used to transmit the first signaling.

In one embodiment, the antenna 452, the receiver 454, the receiving processor 456, and the controller/processor 459 are used to receive a second signaling; at least one of the antenna 420, the transmitter 418, the transmitting processor 416, or the controller/processor 475 is used to transmit a second signaling.

In one embodiment, the antenna 452, the receiver 454, the receiving processor 456, and the controller/processor 459 are used to receive a third signaling; at least one of the antenna 420, the transmitter 418, the transmitting processor 416, or the controller/processor 475 is used to transmit a third signaling.

In one embodiment, the first communication device 450 corresponds to a first node in the present disclosure.

In one embodiment, the second communication device 410 corresponds to a second-type node in the present disclosure.

In one subembodiment of the above embodiment, the second-type node comprises a maintenance base station of the first cell.

In one subembodiment of the above embodiment, the second-type node comprises a maintenance base station of the second cell.

In one subembodiment of the above embodiment, the second-type node comprises a receiver of the first message.

In one subembodiment of the above embodiment, the second-type node comprises a receiver of the second message.

In one embodiment, the first communication device 450 is a UE.

In one embodiment, the first communication device 450 is a UE that supports large delay differences.

In one embodiment, the first communication device 450 is a UE that supports NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay differences.

In one embodiment, the second communication device 410 is a base station that supports NTN.

In one embodiment, the second communication device 410 is a satellite equipment.

In one embodiment, the second communication device 410 is flying platform equipment.

In one embodiment, the second communication device 410 is a base station that supports TN.

In one embodiment, the first communication device 410 comprises at least one processor and at least one memory. The at least one memory comprises computer program codes; the at least one memory and the computer program codes are configured to be used in collaboration with the at least one processor. the first communication device 410 at least: generates first information, the first information indicates a buffer state of a first serving cell group; and when the first serving cell group is in an active state, transmits the first information through the first serving cell group; when the first serving cell group is in an inactive state, transmits the first information through the second serving cell group; herein, the first serving cell group and the second serving cell group are respectively an SCG and an MCG.

In one embodiment, the first communication device 410 comprises a memory that stores a computer readable instruction program. The computer readable instruction program generates an action when executed by at least one processor. The action includes: generating first information, the first information indicating a buffer state of a first serving cell group; when the first serving cell group is in an active state, transmitting the first information through the first serving cell group; when the first serving cell group is in an inactive state, transmitting the first information through the second serving cell group; herein, the first serving cell group and the second serving cell group are respectively an SCG and an MCG.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives first information through a second serving cell group; herein, the first information indicates a buffer state of a first serving cell group; the first serving cell group is in an inactive state; when the first serving cell group is in an active state, the first information is transmitted through the first serving cell group; the first serving cell group and the second serving cell group are respectively an SCG and an MCG.

In one embodiment, the second communication device 450 comprises a memory that stores a computer readable instruction program. The computer readable instruction program generates an action when executed by at least one processor. The action includes: receiving first information through a second serving cell group; herein, the first information indicates a buffer state of a first serving cell group; the first serving cell group is in an inactive state; when the first serving cell group is in an active state, the first information is transmitted through the first serving cell group; the first serving cell group and the second serving cell group are respectively an SCG and an MCG.

In one embodiment, the first communication device 410 corresponds to a first node in the present disclosure.

In one embodiment, the second communication device 450 corresponds to a second node in the present disclosure.

In one embodiment, the first node in the present disclosure comprises the first communication device 410, and the second node in the present disclosure comprises the second communication node 450.

In one embodiment, the first communication device 410 is a UE.

In one embodiment, the second communication device 450 is a UE.

In one embodiment, the first communication device 410 is a gNB.

In one embodiment, the second communication device 450 is a gNB.

Embodiment 5A

Figure 5A:
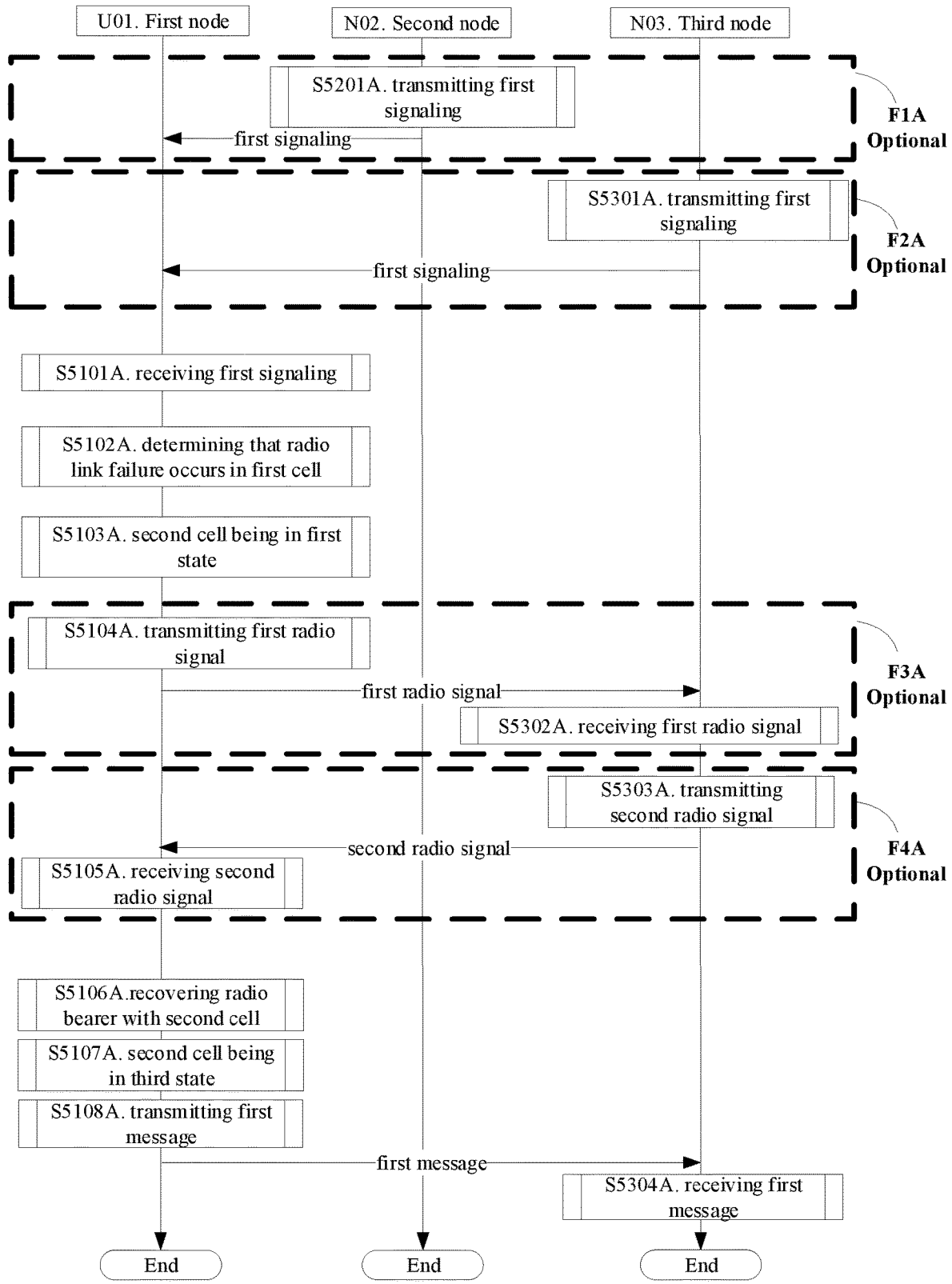
FIG. 5A illustrates a flowchart of radio signal transmission according to one embodiment of the present disclosure.

Embodiment 5A illustrates a flowchart of radio signal transmission according to one embodiment in the present disclosure, as shown in FIG. 5. It is particularly underlined that the order illustrated in the embodiment does not put constraints over sequences of signal transmissions and implementations.

The first node U01 receives a first signaling in step S5101A; determines that an RLF occurs in a first cell in step S5102A; a second cell is in a first state in step S5103A; when a second cell is in a first state, as a response to determining that the RLF occurs in the first cell, and determines that the second cell enters into a third state; transmits a first radio signal in step S5104A, receives a second radio signal in step S5105A, recovers a radio bearer with a second cell, a second cell is in a third state in step S5107A, and transmits a first message in step S5108A.

The second node N02 transmits the first signaling in step S5201A.

The third node N03 transmits the first signaling in step S5301A, receives the first radio signal in step S5302A, transmits the second radio signal in step S5303A, and receives the first message in step S5304A.

In Embodiment 5A, the first message is used for a radio link recovery; when the second cell is in the first state, the first node does not monitor a control signaling on the second cell; when the second cell is in the third state, the first node monitors the control signaling on the second cell; the first radio signal is used to trigger the second cell to enter into the third state, or the second radio signal is used to trigger the second cell to enter into the third state; the first signaling is used to indicate the second cell to enter into the first state.

In one embodiment, the behavior of determining that the second cell enters into a third state comprises recovering a radio bearer with the second cell.

In one embodiment, the behavior of determining that the second cell enters into a third state comprises transmitting a first radio signal.

In one embodiment, the behavior of determining that the second cell enters into a third state comprises receiving a second radio signal.

In one embodiment, the second node N02 is the second-type node in the present disclosure.

In one embodiment, the third node N03 is the second-type node in the present disclosure.

In one embodiment, the phrase of the first signaling being used to indicate the second cell to enter into the first state includes: when the first node receives the first signaling and the first signaling comprises a first indication, it is determined that the second cell is switched to the first state.

In one subembodiment of the above embodiment, the first signaling is used to bear the first indication.

In one subembodiment of the above embodiment, the first signaling carries the first indication.

In one subembodiment of the above embodiment, the first indication comprises one bit.

In one subembodiment of the above embodiment, the first indication comprises K1 bits, K1 being a positive integer greater than 1.

In one subembodiment of the above embodiment, the first indication is a field in the first signaling.

In one subembodiment of the above embodiment, the first indication is an IE in the first signaling.

In one subembodiment of the above embodiment, the first indication comprises the first bitmap in the present disclosure.

In one embodiment, the phrase of the first signaling being used to indicate the second cell to enter into the first state includes: the first signaling is used to determine to switch the second cell to the first state.

In one embodiment, the phrase of the first signaling being used to indicate the second cell to enter into the first state includes: the first signaling indicates the second cell of the first node to enter into a dormancy state.

In one embodiment, a transmitter of the first signaling comprises a maintenance base station of the first cell.

In one embodiment, a transmitter of the first signaling comprises a maintenance base station of the second cell.

In one embodiment, the first signaling is all or part of an RRC signaling.

In one embodiment, the first signaling is all or part of one or more IEs in an RRC signaling.

In one embodiment, the first signaling is all or part of one or more fields in an IE in an RRC signaling.

In one embodiment, the first signaling comprises an RRCReconfiguration message.

In one embodiment, the first signaling comprises a RRC-ConnectionReconfiguration message.

In one embodiment, a Signaling Radio Bearer of the first signaling comprises SRB1.

In one embodiment, a Signaling Radio Bearer of the first signaling comprises SRB3.

In one embodiment, the first signaling comprises a MAC layer signaling.

In one embodiment, the first signaling comprises a MAC CE.

In one embodiment, the first signaling comprises a MAC subheader.

In one embodiment, the first signaling comprises a physical layer signaling.

In one embodiment, the first signaling comprises DCI.

In one embodiment, the phrase of the first radio signal being used to trigger the second cell to enter into a third state includes: the first radio signal is used to trigger the second cell to enter into the third state on pre-defined resources.

In one embodiment, the phrase of the first radio signal being used to trigger the second cell to enter into a third state includes when the first node recovers the radio bearer of the second cell, the first radio signal is transmitted.

In one embodiment, the phrase of the first radio signal being used to trigger the second cell to enter into a third state includes: when the first node switches the second cell to the third state, the first radio signal is transmitted.

In one embodiment, the phrase of the first radio signal being used to trigger the second cell to enter into a third state includes: the first radio signal carrying the first field in the present disclosure is used to switch the second cell in the present disclosure to the third state.

In one subembodiment of the above embodiment, the first field indicates the second cell to enter into a third state.

In one embodiment, a receiver of the first radio signal comprises a maintenance base station of the second cell.

In one embodiment, the first radio signal is transmitted via an air interface.

In one embodiment, the first radio signal is transmitted through an antenna port.

In one embodiment, the first radio signal is transmitted via a Uu interface.

In one embodiment, the first radio signal comprises an uplink signal.

In one embodiment, the first radio signal comprises a baseband signal.

In one embodiment, the first radio signal comprises all or part of a Physical Layer signal.

In one embodiment, the first radio signal comprises all or part of a MAC signaling.

In one embodiment, the first radio signal comprises all or partial fields of a MAC CE.

In one embodiment, the first radio signal comprises all or partial fields of a MAC subheader.

In one embodiment, the first radio signal comprises all or partial fields in a MAC PDU.

In one embodiment, the first radio signal comprises a Cell Radio Network Temporary Identifier (C-RNTI) MAC CE.

In one embodiment, the first radio signal comprises a CCCH SDU.

In one embodiment, the first radio signal comprises all or part of a higher-layer signaling.

In one embodiment, the first radio signal comprises all or part of a higher-layer signaling.

In one embodiment, the first radio signal comprises an RRC message.

In one embodiment, the first radio signal comprises one or more IEs in an RRC message.

In one embodiment, the first radio signal comprises one or more fields in an IE in an RRC message.

In one embodiment, the first radio signal is used to initiate an RA procedure.

In one embodiment, the first radio signal is used to initiate a first-type RA.

In one subembodiment of the above embodiment, the first-type RA comprises a 4-step RACH.

In one subembodiment of the above embodiment, the first-type RA comprises a contention-based RA.

In one subembodiment of the above embodiment, the first-type RA comprises a non-contention-based RA.

In one subembodiment of the above embodiment, the first-type RA comprises a Message 1, a Message 2, a Message 3 and a Message 4.

In one subsidiary embodiment of the subembodiment, the first radio signal comprises a Msg1.

In one subsidiary embodiment of the subembodiment, the first radio signal comprises a Msg3.

In one subsidiary embodiment of the subembodiment, the second signal comprises a Msg2.

In one subsidiary embodiment of the subembodiment, the second signal comprises a Msg4.

In one subembodiment of the above embodiment, the first-type random access comprises a Message 1 and a Message 2.

In one embodiment, the first radio signal is used to initiate a second-type RA.

In one subembodiment of the above embodiment, the second-type random access comprises a 2-step RACH.

In one subembodiment of the above embodiment, the second-type RA comprises a contention-based RA.

In one subembodiment of the above embodiment, the second-type RA comprises a non-contention-based RA.

In one subembodiment of the above embodiment, the second-type RA comprises a Message 1 and a Message 2.

In one subsidiary embodiment of the subembodiment, the first radio signal comprises a MsgA.

In one subsidiary embodiment of the subembodiment, the second signal comprises a MsgB.

In one subsidiary embodiment of the subembodiment, the MsgA comprises all or part of the Msg1 in the present disclosure.

In one subsidiary embodiment of the subembodiment, the MsgA comprises all or part of the Msg3 in the present disclosure.

In one subsidiary embodiment of the subembodiment, the MsgB comprises all or part of the Msg2 in the present disclosure.

In one subsidiary embodiment of the subembodiment, the MsgB comprises all or part of the Msg4 in the present disclosure.

In one embodiment, the first radio signal comprises all or part of a Msg1.

In one subembodiment of the above embodiment, the Msg1 comprises a preamble sequence.

In one subembodiment of the above embodiment, the Msg1 comprises a bit string.

In one subembodiment of the above embodiment, the Msg1 comprises a sequence.

In one subembodiment of the above embodiment, the Msg1 comprises a ZC sequence.

In one subembodiment of the above embodiment, the Msg1 comprises a Gold sequence.

In one subembodiment of the above embodiment, the Msg1 comprises a preamble.

In one subembodiment of the above embodiment, the Msg1 comprises a Physical Random Access Channel (PRACH) signal.

In one subembodiment of the above embodiment, the Msg1 comprises a NPRACH signal.

In one embodiment, the first radio signal comprises all or part of a Msg3.

In one subembodiment of the embodiment, the Msg3 comprises a PUSCH.

In one subembodiment of the embodiment, the Msg3 comprises a payload.

In one subembodiment of the embodiment, the Msg3 comprises MAC information.

In one subembodiment of the embodiment, the Msg3 comprises RRC information.

In one subembodiment of the embodiment, the Msg3 comprises an RRCResumeRequest1 message.

In one subembodiment of the embodiment, the Msg3 comprises an RRCResumeRequest message.

In one subembodiment of the embodiment, the Msg3 comprises an RRCConnectionResumeRequest message.

In one subembodiment of the embodiment, the Msg3 comprises a UE identifier.

In one subembodiment of the embodiment, the Msg3 comprises a C-RNTI.

In one subembodiment of the embodiment, the Msg3 comprises a Buffer Status Report (BSR).

In one subembodiment of the embodiment, the Msg3 comprises a Resume ID.

In one subembodiment of the embodiment, the Msg3 comprises an I-RNTI.

In one subembodiment of the embodiment, the Msg3 comprises an indicator of a size of data.

In one subembodiment of the embodiment, the Msg3 comprises a NAS UE identifier.

In one embodiment, the phrase of the second radio signal being used to trigger the second cell to enter into a third state includes: the second radio signal is used to determine to switch the second cell to the third state.

In one embodiment, the phrase of the second radio signal being used to trigger the second cell to enter into a third state includes: the second radio signal indicates the second cell of the first node to enter into an activate state.

In one embodiment, the phrase of the second radio signal being used to trigger the second cell to enter into a third state includes: when the first node receives the second radio signal and the second radio signal comprises a second indication, it is determined to switch the second cell to the third state.

In one subembodiment of the above embodiment, the second radio signal is used to bear the second indication.

In one subembodiment of the above embodiment, the second radio signal carries the second indication.

In one subembodiment of the above embodiment, the second indication comprises one bit.

In one subembodiment of the above embodiment, the second indication comprises K1 bits, K1 being a positive integer greater than 1.

In one subembodiment of the above embodiment, the second indication is a field in the second radio signal.

In one subembodiment of the above embodiment, the second indication is an IE in the second radio signal.

In one subembodiment of the above embodiment, the second indication comprises the first bitmap in the present disclosure.

In one embodiment, a transmitter of the second radio signal comprises a maintenance base station of the first cell.

In one embodiment, a transmitter of the second radio signal comprises a maintenance base station of the second cell.

In one embodiment, the second radio signal is all or part of an RRC signaling.

In one embodiment, the second radio signal is all or part of one or more IEs in an RRC signaling.

In one embodiment, the second radio signal is all or part of one or more fields in an IE in an RRC signaling.

In one embodiment, the second radio signal comprises an RRCReconfiguration message.

In one embodiment, the second radio signal comprises an RRCConnectionReconfiguration message.

In one embodiment, the second radio signal comprises an RRCResume message.

In one embodiment, the second radio signal comprises an RRCConnectionResume message.

In one embodiment, a Signaling Radio Bearer of the second radio signal comprises SRB1.

In one embodiment, a Signaling Radio Bearer of the second radio signal comprises SRB3.

In one embodiment, the second radio signal comprises a MAC layer signaling.

In one embodiment, the second radio signal comprises a MAC CE.

In one embodiment, the second radio signal comprises a MAC subheader.

In one embodiment, the second radio signal comprises a physical layer signaling.

In one embodiment, the second radio signal comprises DCI.

In one embodiment, the second radio signal comprises the first bitmap in the present disclosure.

In one embodiment, the second radio signal and the first signaling comprise a same RRC message.

In one embodiment, the second radio signal is the same as the first signaling.

In one embodiment, the second radio signal is different from the first signaling.

In one embodiment, the second radio signal and the first signaling do not comprise a same RRC message.

In one embodiment, the meaning of the recovery includes resuming.

In one embodiment, the meaning of the recovery includes restoring.

In one embodiment, the radio bearer comprises a radio bearer (RB).

In one embodiment, the radio bearer comprises an SRB.

In one subembodiment of the above embodiment, the SRB is used to transmit a control signaling.

In one subembodiment of the above embodiment, the SRB is used to transmit an RRC message.

In one subembodiment of the above embodiment, the SRB is used to transmit a NAS message.

In one subembodiment of the above embodiment, the SRB comprises SRB0.

In one subembodiment of the above embodiment, the SRB comprises SRB1.

In one subembodiment of the above embodiment, the SRB comprises SRB2.

In one subembodiment of the above embodiment, the SRB comprises SRB3.

In one subembodiment of the above embodiment, the SRB comprises a split SRB.

In one subsidiary embodiment of the above embodiment, the split SRB is used for Dual Connectivity (DC).

In one subsidiary embodiment of the above embodiment, the split SRB supports being transmitted through an MCG and an SCG.

In one embodiment, the radio bearer comprises a DRB.

In one subembodiment of the above embodiment, the DRB is used to transmit data.

In one subembodiment of the above embodiment, the DRB is used to bear user plane data.

In one embodiment, the radio bearer comprises a DAPS bearer.

In one subembodiment of the above embodiment, during handover of DAPS, a protocol stack beared by the DAPS is located in a serving base station of a source cell and a serving base station of a target cell at the same time.

In one subsidiary embodiment of the above embodiment, the source cell comprises the first cell.

In one subsidiary embodiment of the above embodiment, a serving base station of the source cell comprises a source gNB.

In one subsidiary embodiment of the above embodiment, a serving base station of the target cell comprises a target gNB.

In one subembodiment of the above embodiment, during handover of DAPS, the DAPS bears resources simultaneously using a serving base station of a source cell and a serving base station of a target cell.

In one embodiment, the action of recovering a radio bearer with the second cell includes recovering an SRB with the second cell.

In one embodiment, the action of recovering a radio bearer with the second cell includes recovering SRB1 with the second cell.

In one embodiment, the action of recovering a radio bearer with the second cell includes recovering split SRB1 with the second cell.

In one embodiment, the action of recovering a radio bearer with the second cell includes recovering SRB3 with the second cell.

In one embodiment, the action of recovering a radio bearer with the second cell includes recovering a DRB with the second cell.

In one embodiment, the behavior of determining that the second cell enters into a third state comprises recovering a radio bearer with the second cell. transmitting a first radio signal; herein, the first radio signal is used to trigger the second cell to enter into the third state.

In one subembodiment of the above embodiment, when the second cell enters into the third state, a radio bearer with the second cell is recovered first, then the first radio signal is transmitted.

In one subembodiment of the above embodiment, when the second cell enters into the third state, the first radio signal is transmitted first, then a radio bearer with the second cell is recovered.

In one embodiment, the behavior of determining that the second cell enters into a third state comprises recovering a radio bearer with the second cell; transmitting the first radio signal; receiving the second radio signal, herein, the second radio signal is used to trigger the second cell to enter into the third state.

In one subembodiment of the above embodiment, when the second cell enters into the third state, a radio bearer with the second cell is recovered first; then the first radio signal is transmitted, and the second radio signal is received.

In one subembodiment of the above embodiment, when the second cell enters into the third state, the first radio signal is transmitted first, and the second radio signal is received; then a radio bearer with the second cell is recovered.

In one subembodiment of the above embodiment, when the second cell enters into the third state, the first radio signal is transmitted first; then a radio bearer with the second cell is recovered; and then the second radio signal is received.

In one embodiment, the first radio signal and the second radio signal are used to trigger the second cell to enter into a third state.

In one embodiment, the phrase of "the behavior of determining that the second cell enters into a third state comprises transmitting a first radio signal" includes: transmitting the first radio signal is an action of the behavior of determining that the second cell enters into a third state.

In one embodiment, the phrase of "the behavior of determining that the second cell enters into a third state comprises transmitting a first radio signal" includes: the behavior of determining that the second cell enters into a third state comprises a plurality of actions, and transmitting the first radio signal is one of the plurality of actions.

In one embodiment, the dotted box F1A is optional.
In one embodiment, the dotted box F1A exists.
In one embodiment, the dotted box F1A does not exist.
In one embodiment, the dotted box F2A is optional.
In one embodiment, the dotted box F2A exists.
In one embodiment, the dotted box F2A does not exist.
In one embodiment, the dotted box F3A is optional.
In one embodiment, the dotted box F3A exists.
In one embodiment, the dotted box F3A does not exist.
In one embodiment, the dotted box F4A is optional.
In one embodiment, the dotted box F4A exists.
In one embodiment, the dotted box F4A does not exist.

Embodiment 5B

Figure 5B:
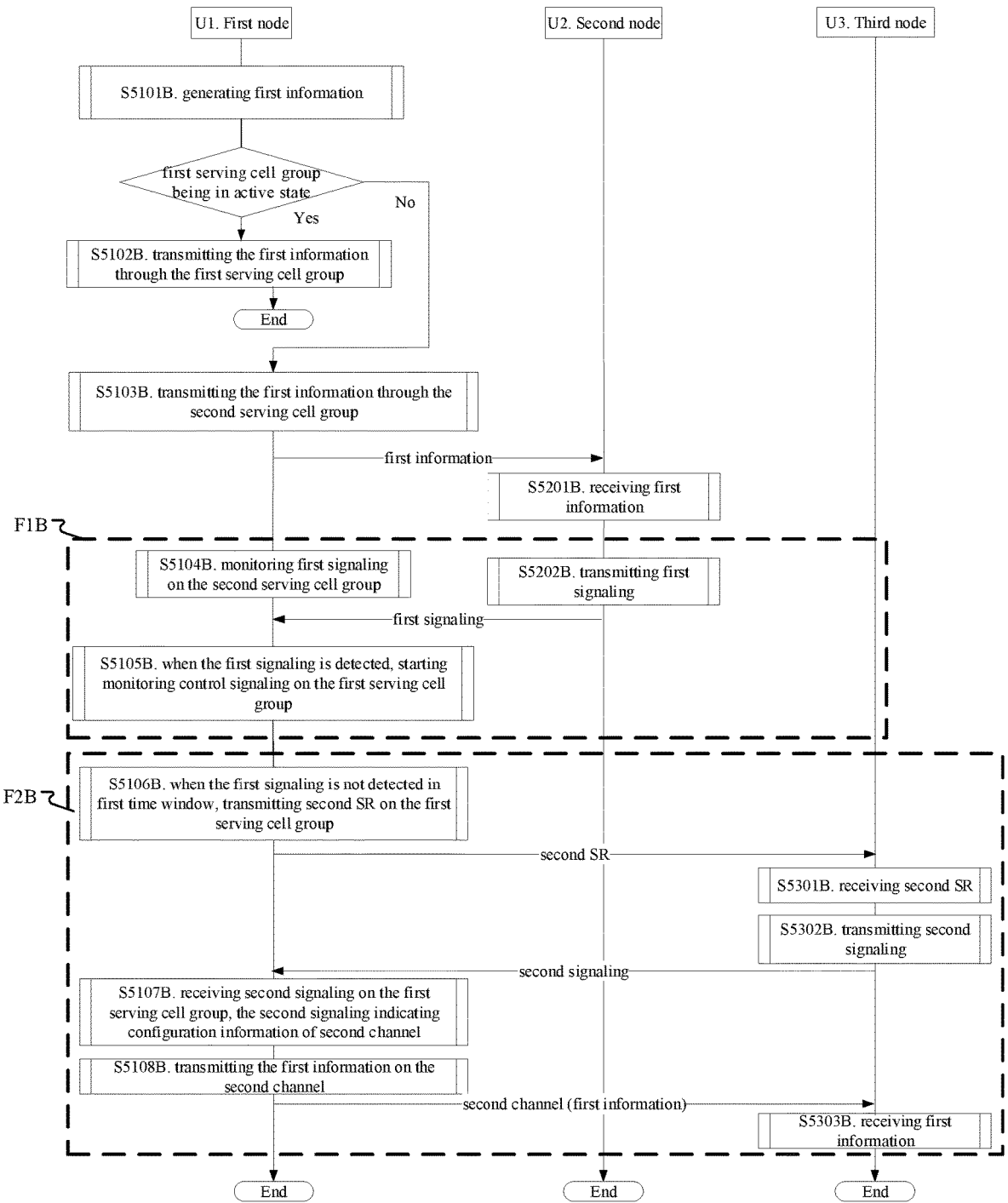
FIG. 5B illustrates a flowchart of radio signal transmission according to one embodiment of the present disclosure.

Embodiment 5B illustrates a flowchart of radio signal transmission according to one embodiment in the present disclosure, as shown in FIG. 5B. In FIG. 5B, the sequential order of steps in these boxes does not necessarily mean that the steps are chronologically arranged. In FIG. 5B, steps in the dotted boxes F1B and F2B are optional.

The first node U1 generates first information in step S5101B, the first information indicates a buffer state of a first serving cell group; when the first serving cell group is in an active state, transmits the first information through the first serving cell group in step S5102B; when the first serving cell group is in an inactive state, transmits the first information through the second serving cell group in step S5103B; monitors a first signaling on the second serving cell group in step S5104B; when the first signaling is detected, starts monitoring a control signaling of the first serving cell group in step S5105B; when the first signaling is not detected in a first time window, transmits a second SR in the first serving cell group in step S5106B; receives a second signaling on the first serving cell group in step S5107B, the second signaling indicates configuration information of a second channel; and transmits the first information on the second channel in step S5108B;

the second node U2 receives first information in step S5201B; transmits a first signaling in step S5202B;

the third node U3 receives a second SR in step S5301B; transmits a second signaling in step S5302B; receives first information through a second channel in step S5303B;

herein, the first serving cell group and the second serving cell group are respectively an SCG and an MCG; the first information is used to trigger the first signaling; a start position of the first time window depends on time-domain resources occupied by the first information; and the first information is used to trigger the second SR.

In one embodiment, before the first signaling is detected, the first serving cell is in an inactive state.

In one embodiment, after the first signaling is detected, the first serving cell group is in an active state.

In one embodiment, after the first signaling is processed, the first serving cell group is in an active state.

In one embodiment, the first signaling is used to recover an active state of the first serving cell group.

In one embodiment, the first signaling is used to activate the first serving cell group.

In one embodiment, the first signaling indicates recovering an active state of the first serving cell group.

In one embodiment, when the first signaling is detected, the first serving cell group is in an inactive state.

In one embodiment, the first signaling being detected includes by monitoring the first signaling, determining that the first signaling exists.

In one embodiment, when the first signaling is detected, a fourth signaling is transmitted, and the fourth signaling indicates that the processing of activating a first serving cell group is completed.

In one embodiment, when the first signaling is processed, a fourth signaling is transmitted, and the fourth signaling indicates that the processing of activating a first serving cell group is completed.

In one embodiment, when the first signaling is processed, a fourth signaling is transmitted, and the fourth signaling indicates that a first serving cell group is activated.

In one embodiment, when the first signaling is processed, a fourth signaling is transmitted, and the fourth signaling indicates that a first serving cell group is in an active state.

In one embodiment, after the first signaling is processed, the first serving cell group is in an inactive state.

In one embodiment, the first signaling indicates that the first serving cell group remains inactive.

In one embodiment, a length of the first time window is pre-configured.

In one embodiment, a length of the first time window is indicated by a fifth signaling, and the fifth signaling indicates that the first serving cell group is deactivated.

In one subembodiment of the above embodiment, the fifth signaling comprises a MAC CE.

In one subembodiment of the above embodiment, the fifth signaling comprises an RRC signaling.

In one embodiment, a length of the first time window is configured through a System Information Block (SIB).

In one embodiment, a length of the first time window is configured through an RRC signaling.

In one embodiment, a length of the first time window is configured through a higher layer signaling.

In one embodiment, the phrase of a start position of the first time window depending on time-domain resources occupied by the first information includes: a start position of the first time window is a next slot of time-domain resources occupied by the first information.

In one embodiment, the phrase of a start position of the first time window depending on time-domain resources occupied by the first information includes: a start position of the first time window is determined by time-domain resources occupied by the first information and a first time-domain resource offset.

In one subembodiment of the above embodiment, the first time-domain resource offset is pre-configured.

In one subembodiment of the above embodiment, the first time-domain resource offset is indicated by a fifth signaling, and the fifth signaling indicates that the first serving cell group is deactivated.

In one subembodiment of the above embodiment, the first time-domain resource offset is configured through an SIB.

In one embodiment, the second SR comprises UCI.

In one embodiment, the second SR comprises a preamble.

In one embodiment, a preamble comprised by the second SR is pre-configured.

In one embodiment, a preamble comprised by the second SR is indicated by a fifth signaling, and the fifth signaling indicates that the first serving cell group is deactivated.

In one embodiment, a preamble comprised by the second SR is configured through an SIB.

In one embodiment, a preamble comprised by the second SR is configured through an RRC signaling.

In one embodiment, a preamble comprised by the second SR is configured through a higher-layer signaling.

In one embodiment, radio resources occupied by the second SR are pre-configured.

In one embodiment, radio resources transmitting the second SR are indicated by a fifth signaling, and the fifth signaling indicates that the first serving cell group is deactivated.

In one embodiment, radio resources occupied by the second SR are configured through an SIB.

In one embodiment, radio resources occupied by the second SR are configured through an RRC signaling.

In one embodiment, radio resources occupied by the second SR are configured through a higher-layer signaling.

In one subembodiment of the above embodiment, radio resources occupied by the second SR comprise time-domain resources occupied by the second SR.

In one subembodiment of the above embodiment, radio resources occupied by the second SR comprise frequency-domain resources occupied by the second SR.

In one subembodiment of the above embodiment, radio resources occupied by the second SR comprise a multi-access signature occupied by the second SR.

In one embodiment, in the first time window, the second SR is not allowed to be transmitted on the first serving cell group.

In one embodiment, the second SR is transmitted on a PRACH.

In one embodiment, the second SR is transmitted on a PUCCH.

In one embodiment, the second SR is transmitted on a physical uplink channel.

In one embodiment, continuing to transmit a second SR has the advantages over: communications between a first node and a second serving cell may be interrupted, transmitting a second SR through a first serving cell group can immediately transmit first information, on one hand, reliability of transmitting first information can be enhanced, on the other hand, a first cell group can be immediately activated, thus reducing transmission delay of small data.

In one embodiment, the second SR is used to trigger the second signaling.

In one embodiment, configuration information of the second channel comprises radio resources occupied by a second channel.

In one subembodiment of the above embodiment, radio resources occupied by the second channel comprise time-domain resources occupied by the second channel.

In one subembodiment of the above embodiment, radio resources occupied by the second channel comprise frequency-domain resources occupied by the second channel.

In one subembodiment of the above embodiment, radio resources occupied by the second channel comprise a multi-access signature occupied by the second channel.

In one embodiment, configuration information of the second channel comprises a Modulation and Coding Scheme (MCS) employed by a second channel.

In one embodiment, configuration information of the second channel comprises configuration of a DMRS employed by a second channel.

In one embodiment, the second channel comprises a PUSCH.

In one embodiment, the second channel comprises a PUCCH.

In one embodiment, when a second SR is transmitted on the first serving cell group, the first serving cell group is in an inactive state.

In one embodiment, time-frequency resources occupied by the second channel correspond to a first serving cell group.

In one embodiment, time-frequency resources occupied by the second channel correspond to a serving cell in a first serving cell group.

In one embodiment, the first information transmitted on the second channel is scrambled by a user identity allocated by the first serving cell group.

In one embodiment, a user identity allocated by the first serving cell group is a C-RNTI.

In one embodiment, a number of bits comprised in a user identity allocated by the first serving cell is a positive integral multiple of 8.

In one embodiment, the first information comprises a first logical channel group identity and a first buffer size, and the first buffer size indicates a size of data available to a logical channel group identified by the first logical channel group identity; the first logical channel group identity is allocated to the first serving cell group.

In one embodiment, the first logical channel group identity is only allocated to the first serving cell group instead of to the second serving cell group.

In one embodiment, the first information comprises a first logical channel group identity and a first buffer size, and the first buffer size indicates a size of data available to a logical channel group identified by the first logical channel group identity; the first information is transmitted on a first MAC CE, a MAC subheader corresponding to the first MAC CE indicates that the first logical channel group identity corresponds to the first serving cell group.

In one subembodiment of the above embodiment, a MAC subheader corresponding to the first MAC CE comprises a first LCID, and the first LCID indicates that a first logical channel group identity corresponds to the first serving cell group.

In one embodiment, the first information comprises a first logical channel group identity and a first buffer size, and the first buffer size indicates a size of data available to a logical channel group identified by the first logical channel group identity; the first information is transmitted on a first MAC CE, the first MAC CE comprises a first identity, and the first identity indicates that the first logical channel group identity corresponds to the first serving cell group.

In one embodiment, the first information comprises a first logical channel group identity and a first buffer size, and the first buffer size indicates a size of data available to a logical channel group identified by the first logical channel group identity; the first information is transmitted on a first MAC CE, and the first MAC CE is used to carry information for the first serving cell group.

In one embodiment, the first node and the second node are connected via a Uu interface.

In one embodiment, the first node and the third node are connected via a Uu interface.

In one embodiment, the second node and the third node are connected via an Xn interface.

In one embodiment, the second node and the third node are connected via an X2 interface.

In one embodiment, the second node and the third node are connected via a wired interface.

Embodiment 6A

Figure 6A:
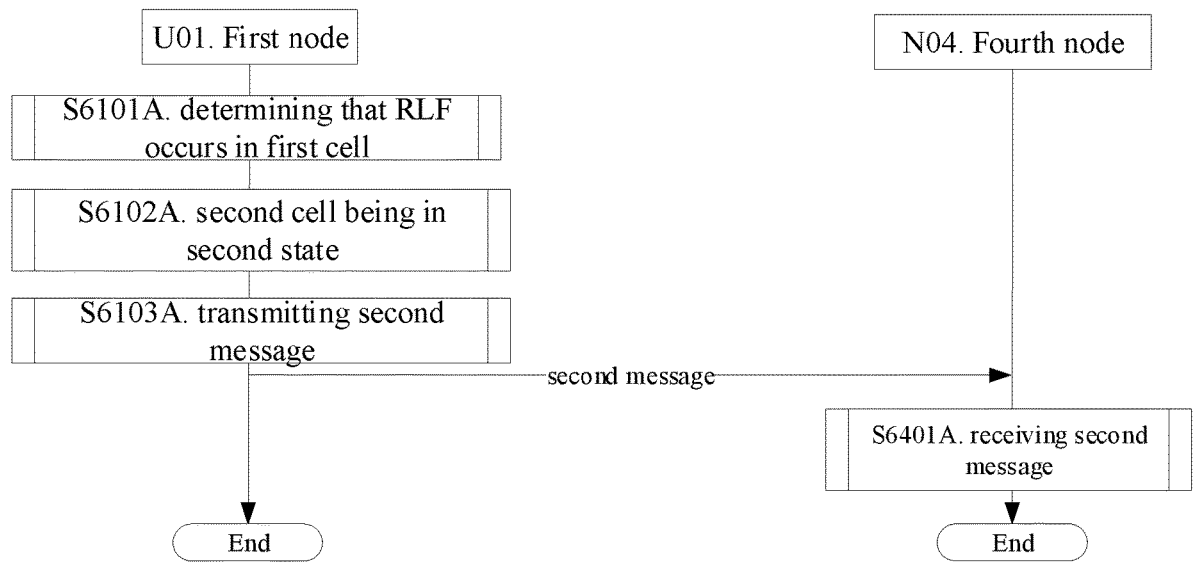
FIG. 6A illustrates a flowchart of radio signal transmission according to another embodiment of the present disclosure.

Embodiment 6A illustrates a flowchart of radio signal transmission according to another embodiment of the present disclosure, as shown in FIG. 6A. It is particularly underlined that the order illustrated in the embodiment does not put constraints over sequences of signal transmissions and implementations.

The first node U01 determines that an RLF occurs in a first cell in step S6101A, a second cell is in a second state in step S6102A, and transmits a second message in step S6103A.

The fourth node N04 receives the second message in step S6401A.

In Embodiment 6A, it is determined that an RLF occurs in a first cell; when the second cell is in a second state, as a response to determining that the RLF occurs in the first cell, a second message is transmitted; herein, the second message is used for a radio connection re-establishment.

In one embodiment, the first node U01 comprises a UE.

In one embodiment, the first node U01 is connected with the second node N02 and the third node N03 at the same time.

In one embodiment, the first cell is a cell in the second node N02.

In one embodiment, the second cell is a cell in the third node N03.

In one embodiment, the fourth node N04 is the second-type node in the present disclosure.

In one embodiment, the fourth node N04 is determined through cell selection.

In one embodiment, the fourth node N04 is determined through cell re-selection.

In one embodiment, the fourth node N04 is determined through cell measurement.

In one embodiment, the fourth node N04 is different from a maintenance base station of the first cell and a maintenance base station of the second cell.

In one embodiment, the fourth node N04 is the same as a maintenance base station of the first cell.

In one embodiment, the fourth node N04 is the same as a maintenance base station of the second cell.

In one embodiment, the step S6101A and the step S6102A occur at the same time.

In one embodiment, the step S6101A is taken before the step S6102A.

In one embodiment, the step S6101A is taken after the step S6102A.

Embodiment 6B

Figure 6B:
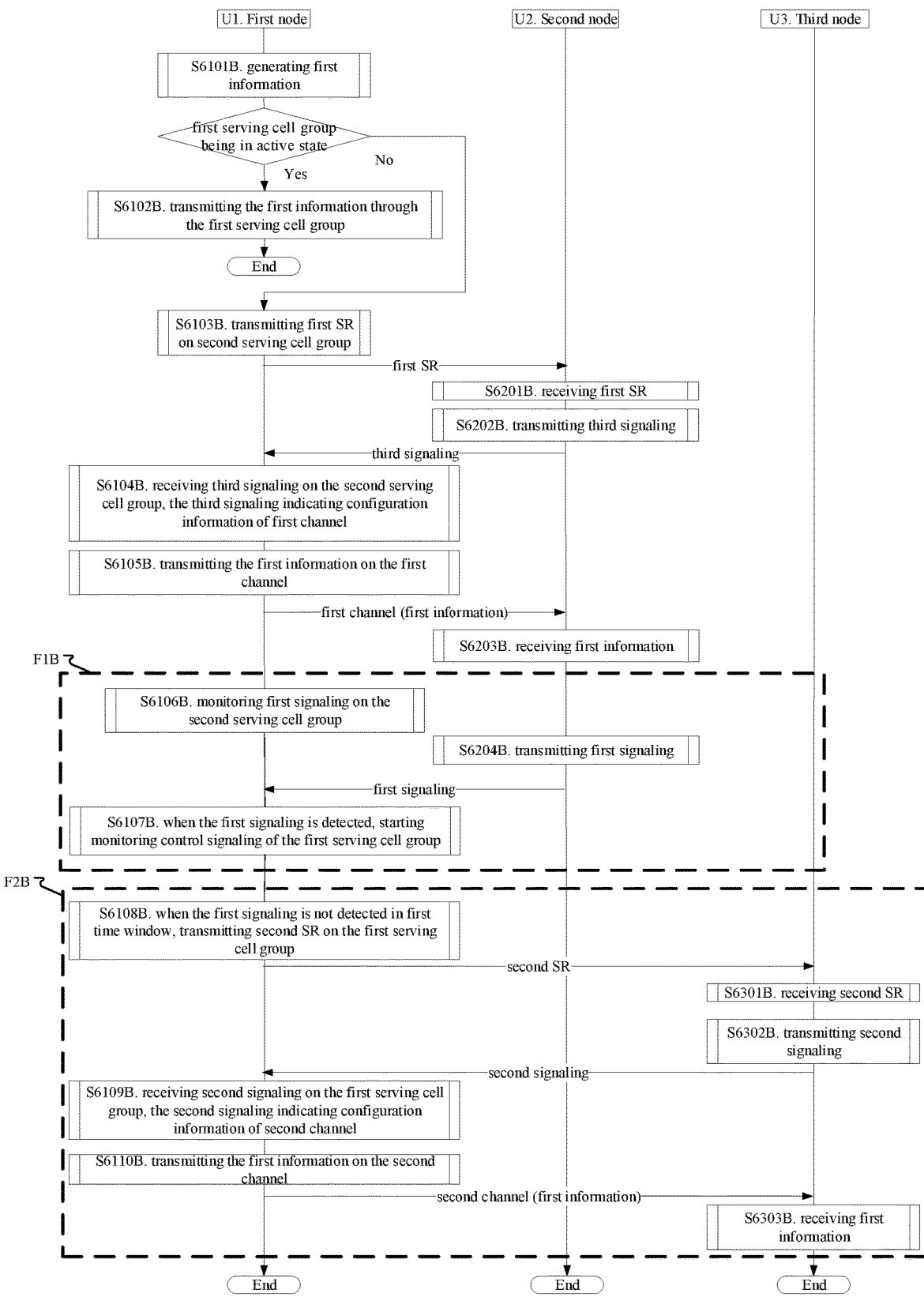
FIG. 6B illustrates a flowchart of radio signal transmission according to another embodiment of the present disclosure.

Embodiment 6B illustrates a flowchart of radio signal transmission according to one embodiment of the present disclosure, as shown in FIG. 6B. In FIG. 6B, the sequential order of steps in these boxes does not necessarily mean that the steps are chronologically arranged. In FIG. 6B, steps in the dotted boxes F1B and F2B are optional.

The first node U1 generates first information in step S6101B, the first information indicates a buffer state of a first serving cell group; when the first serving cell group is in an active state, transmits the first information through the first serving cell group in step S6102B; when the first serving cell group is in an active state, transmits a first SR on the second serving cell group in step S6103B; receives a third signaling on the second serving cell group in step S6104B, and the third signaling indicates configuration information of a first channel; transmits the first information on the first channel in step S6105B; monitors a first signaling on the second serving cell group in step S6106B; when the first signaling is detected, starts monitoring a control signaling of the first serving cell group in step S6107B; when the first signaling is not detected in a first time window, transmits a second SR in the first serving cell group in step S6108B; receives a second signaling on the first serving cell group in step S6109B, and the second signaling indicates configuration information of a second channel; transmits the first information on the second channel in step S6110B;

the second node U2 receives a first SR in step S6201B; transmits a third signaling in step S6202B; receives first information in step S6203B; and transmits a first signaling in step S6204B;

the third node U3 receives a second SR in step S6301B; transmits a second signaling in step S6302B; receives first information through a second channel in step S6303B;

herein, the first serving cell group and the second serving cell group are respectively an SCG and an MCG; the first information is used to trigger the first signaling; a start position of the first time window depends on time-domain resources occupied by the first information; and the first information is used to trigger the second SR; the first information is used to trigger a first SR, and the first information is transmitted on the first channel; radio resources occupied by the first SR are used to determine whether a buffer state indicated by the first information is for the first serving cell group or the second serving cell group.

In one embodiment, the first SR comprises a piece of UCI.

In one embodiment, the first SR comprises a preamble.

In one embodiment, a preamble comprised by the first SR is allocated to the first serving cell group.

In one embodiment, the first SR is transmitted on a PRACH.

In one embodiment, the first SR is transmitted on a PUCCH.

In one embodiment, the first SR is transmitted on a physical uplink channel.

In one embodiment, the first SR comprises a piece of UCI.

In one embodiment, a preamble comprised by the first SR is pre-configured.

In one embodiment, a preamble comprised by the first SR is indicated by a fifth signaling, and the fifth signaling indicates that the first serving cell group is deactivated.

In one embodiment, a preamble comprised by the first SR is configured through an SIB.

In one embodiment, a preamble comprised by the first SR is configured through an RRC signaling.

In one embodiment, a preamble comprised by the first SR is configured through a higher-layer signaling.

In one embodiment, radio resources occupied by the first SR are pre-configured.

In one embodiment, radio resources transmitting the first SR are indicated by a fifth signaling, and the fifth signaling indicates that the first serving cell group is deactivated.

In one embodiment, radio resources occupied by the first SR are configured through an SIB.

In one embodiment, radio resources occupied by the first SR are configured through an RRC signaling.

In one embodiment, radio resources occupied by the first SR are configured through a higher-layer signaling.

In one subembodiment of the above embodiment, radio resources occupied by the first SR comprise time-domain resources occupied by the first SR.

In one subembodiment of the above embodiment, radio resources occupied by the first SR comprise frequency-domain resources occupied by the first SR.

In one subembodiment of the above embodiment, radio resources occupied by the first SR comprise a multi-access signature occupied by the first SR.

In one embodiment, the first SR is used to trigger the third signaling.

In one embodiment, radio resources occupied by the first SR are used to determine radio resources occupied by the third signaling.

In one embodiment, the radio resources occupied by the first SR comprise time-domain resources occupied by the first SR.

In one embodiment, the radio resources occupied by the first SR comprise frequency-domain resources occupied by the first SR.

In one embodiment, the radio resources occupied by the first SR comprise a multi-access signature occupied by the first SR.

In one embodiment, the radio resources occupied by the third signaling comprise time-domain resources occupied by the third signaling.

In one embodiment, the radio resources occupied by the third signaling comprise a search space occupied by the third signaling.

In one embodiment, the radio resources occupied by the third signaling comprise a CORESET occupied by the third signaling.

In one subembodiment of the above embodiment, the phrase of radio resources occupied by the first SR being used to determine radio resources occupied by the third signaling includes: time-domain resources occupied by the first SR are used to determine time-domain resources occupied by the third signaling.

In one subembodiment of the above embodiment, the phrase of radio resources occupied by the first SR being used to determine radio resources occupied by the third signaling includes: frequency-domain resources occupied by the first SR are used to determine frequency-domain resources occupied by the third signaling.

In one embodiment, radio resources occupied by the first SR are used to determine a signaling format of the third signaling, and the signaling format of the third signaling implicitly indicates that the first channel is allocated to the first information.

In one embodiment, radio resources occupied by the first SR are used to determine time-frequency resources occupied by the first channel, and the signaling format of the third signaling implicitly indicates that the first channel is allocated to the first information.

In one embodiment, the third signaling comprises a piece of DCI.

In one embodiment, the signaling format of the third signaling indicates a signaling format of DCI comprised in the third signaling.

In one embodiment, the third signaling comprises second indication information, and the second indication information indicates that the first channel is allocated to the first information.

In one embodiment, the third signaling is received before the first SR is transmitted.

In one embodiment, the third signaling indicates that a first serving cell group is deactivated.

In one embodiment, the third signaling includes part or all of an RRC signaling.

In one embodiment, the third signaling comprises a higher-layer signaling.

In one embodiment, radio resources occupied by the first SR are used to determine time-domain resources occupied by the first channel.

In one embodiment, radio resources occupied by the first SR are used to determine time-frequency-domain resources occupied by the first channel.

In one embodiment, radio resources occupied by the first SR are used to determine time-frequency resources occupied by the first channel.

In one embodiment, configuration information of the first channel comprises at least one of time-domain resources occupied by the first channel, frequency-domain resources occupied by the first channel, an MCS occupied by the first channel, a DMRS configuration occupied by the first channel or a multi-access signature occupied by the first channel.

In one embodiment, the first channel is transmitted on a second serving cell group.

In one embodiment, the first channel is transmitted on any serving cell in a second serving cell group.

In one embodiment, time-frequency resources occupied by the first channel correspond to a second serving cell group.

In one embodiment, time-frequency resources occupied by the first channel correspond to a serving cell in a second serving cell group.

In one embodiment, the first information transmitted on the first channel is scrambled by a user identity allocated by the second serving cell group.

In one embodiment, a user identity allocated by the second serving cell group is a C-RNTI.

In one embodiment, a number of bits comprised in a user identity allocated by the second serving cell is a positive integral multiple of 8.

Embodiment 7A

Figure 7A:
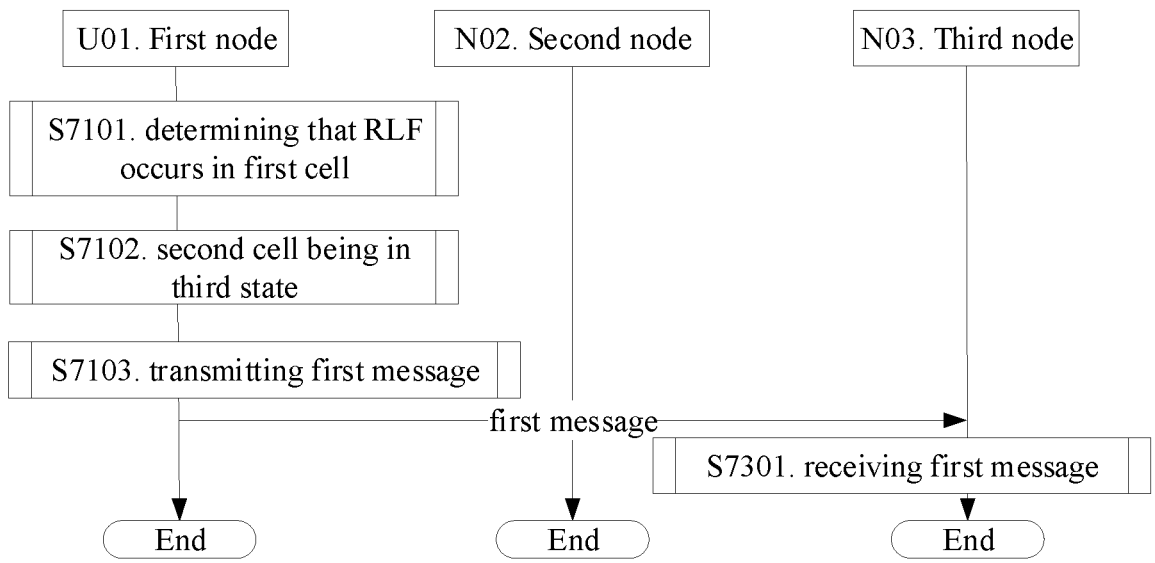
FIG. 7A illustrates a flowchart of radio signal transmission according to another embodiment of the present disclosure.

Embodiment 7A illustrates a flowchart of radio signal transmission according to another embodiment in the present disclosure, as shown in FIG. 7A. It is particularly underlined that the order illustrated in the embodiment does not put constraints over sequences of signal transmissions and implementations.

The first node U01 determines that an RLF occurs in a first cell in step S7101; a second cell is in a third state in step S7102; and transmits first information in step S7103.

The third node N03 receives the first message in step S7301.

In Embodiment 7A, it is determined that an RLF occurs in a first cell; when the second cell is in a third state, as a response to determining that the RLF occurs in the first cell, the first message is transmitted; herein, the first message is used for a radio link recovery; when the second cell is in the third state, the first node monitors the control signaling on the second cell.

In one embodiment, the first node U01 comprises a UE.

In one embodiment, the first node U01 is connected with the second node N02 in the present disclosure and the third node N03 in the present disclosure at the same time.

In one embodiment, the first cell is a cell in the second node N02 in the present disclosure.

In one embodiment, the second cell is a cell in the third node N03.

In one embodiment, the step S7101 and the step S7102 occur at the same time.

In one embodiment, the step S7101 is taken before the step S7102.

In one embodiment, the step S7101 is taken after the step S7102.

Embodiment 7B

Figure 7B:
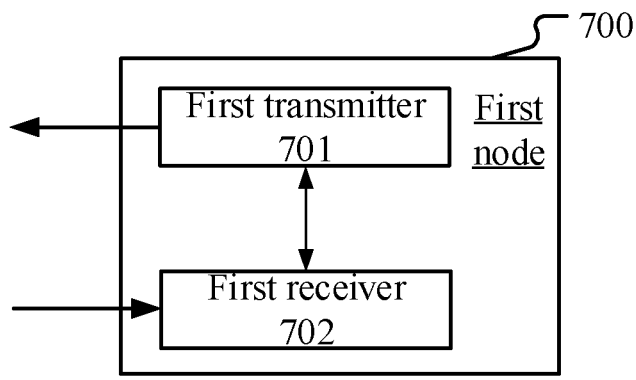
FIG. 7B illustrates a structure block diagram of a processing device in first node according to one embodiment of the present disclosure.

Embodiment 7B illustrates a structure block diagram of a processing device in first node according to one embodiment of the present disclosure, as shown in FIG. 7B. In Embodiment 7B, a first node's processing device 700 comprises a first transmitter 701 and a first receiver 702.

The first receiver 702 generates first information, and the first information indicates a buffer state of a first serving cell group;

the first transmitter 701, when the first serving cell group is in an active state, transmits the first information through the first serving cell group; and when the first serving cell group is in an inactive state, transmits the first information through the second serving cell group;

in Embodiment 7B, the first serving cell group and the second serving cell group are respectively an SCG and an MCG.

In one embodiment, the first receiver 702 monitors a first signaling on the second serving cell group; when the first signaling is detected, starts monitoring a control signaling of the first serving cell group;

herein, the first serving cell group is in an inactive state; and the first information is used to trigger the first signaling.

In one embodiment, when there is data to be transmitted in a first MAC entity, the first information is generated.

In one embodiment, the first MAC entity corresponds to an RB between the first node and a first serving cell group to which it belongs.

In one embodiment, the first MAC entity corresponds to a first serving cell group.

In one embodiment, the first information is transmitted through an RRC signaling.

In one embodiment, the first information is transmitted through a MAC CE.

In one embodiment, the phrase of the first serving cell being in an active state includes monitoring a control signaling of the first serving cell group.

In one embodiment, the phrase of the first serving cell being in an inactive state includes stopping monitoring a control signaling of the first serving cell group.

In one embodiment, the first transmitter 701 comprises the antenna 420, the transmitter 418, the multi-antenna transmitting processor 471, the transmitting processor 416, the controller/processor 475 and the controller/processor 475 in FIG. 4 in the present disclosure.

In one embodiment, the first transmitter 701 comprises at least one of the antenna 420, the transmitter 418, the multi-antenna transmitting processor 471, the transmitting processor 416, the controller/processor 475 or the controller/processor 475 in FIG. 4 in the present disclosure.

In one embodiment, the first receiver 702 comprises the antenna 420, the receiver 418, the multi-antenna receiving processor 472, the receiving processor 470 and the controller/processor 475 and the memory 476 in FIG. 4 in the present disclosure.

In one embodiment, the first receiver 702 comprises at least one of the antenna 420, the receiver 418, the multi-antenna receiving processor 472, the receiving processor 470 and the controller/processor 475 and the memory 476 in FIG. 4 in the present disclosure.

Embodiment 8A

Figure 8A:
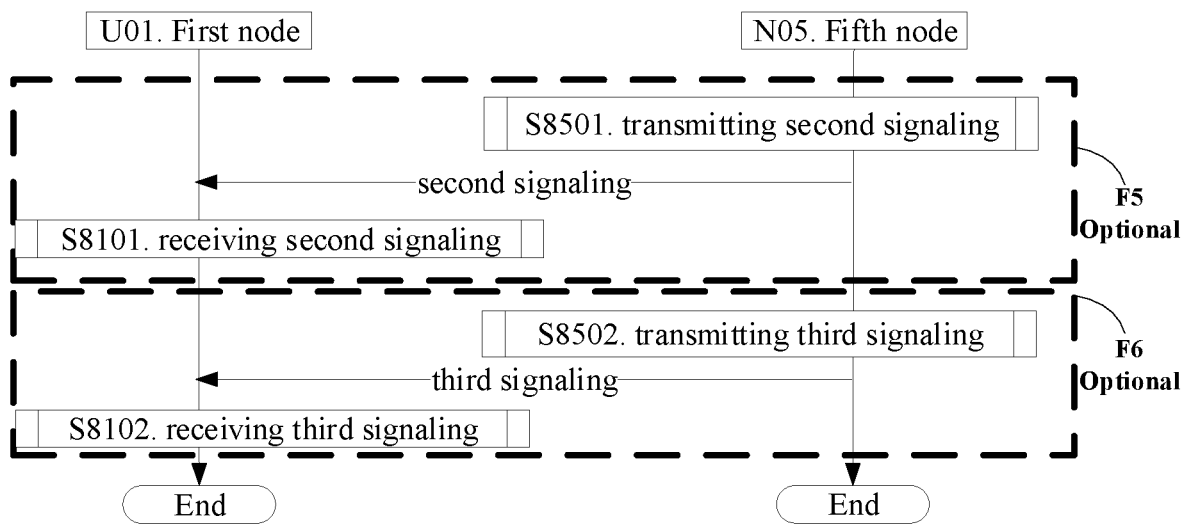
FIG. 8A illustrates a flowchart of transmission of a second signaling and a third signaling according to one embodiment of the present disclosure.

Embodiment 8A illustrates a flowchart of transmission of a second signaling and a third signaling according to one embodiment of the present disclosure, as shown in FIG. 8A. It is particularly underlined that the order illustrated in the embodiment does not put constraints over sequences of signal transmissions and implementations.

The first node U01 receives a second signaling in step S8101; and receives a third signaling in step S8102.

The fifth node N05 transmits a second signaling in step S8501; and transmits a third signaling in step S8502.

In Embodiment 8A, when a first condition set is satisfied, a first timer is started; when the first timer is running, the second cell is switched to the third state, and the first timer is stopped; when the first timer is expired, an RRC connection re-establishment procedure is initiated; the second signaling comprises a first expiration value, and the first expiration value is used to determine a maximum running time of the first timer; the third signaling is used to indicate whether the second cell enters into the third state from the first state.

In one embodiment, the fifth node N05 comprises the second node N02.

In one embodiment, the fifth node N05 comprises the third node N03.

In one embodiment, the second signaling is transmitted via an air interface.

In one embodiment, the second signaling is transmitted via an antenna port.

In one embodiment, the second signaling comprises a downlink signal.

In one embodiment, the second signaling comprises a sidelink signal.

In one embodiment, the second signaling comprises all or part of a high-layer signaling.

In one embodiment, the second signaling comprises all or part of a higher-layer signaling.

In one embodiment, the second signaling comprises an RRC message.

In one embodiment, the second signaling comprises all or partial IEs in an RRC message.

In one embodiment, the second signaling comprises all or partial fields of an IE in an RRC Message.

In one embodiment, the second signaling comprises a UE-TimersAndConstants.

In one embodiment, the second signaling comprises an RLF-TimersAndConstants.

In one embodiment, the second signaling comprises an SIB1.

In one embodiment, the second signaling comprises an RRCReconfiguration message.

In one embodiment, the second signaling comprises an RRCConnectionReconfiguration message.

In one embodiment, the phrase of the second signaling comprising the first expiration value includes: the second signaling indicates the first expiration value.

In one embodiment, the phrase of the second signaling comprising the first expiration value includes: the second signaling is used to configure the first expiration value of the first timer.

In one embodiment, the phrase of the second signaling comprising the first expiration value includes: the second signaling is used to determine the first expiration value.

In one embodiment, the phrase of the second signaling comprising the first expiration value includes: the first expiration value is a field in the second signaling.

In one embodiment, the phrase of the first expiration value being used to determine a maximum running time of a first timer includes: the first expiration value is equal to a maximum running time of the first timer.

In one embodiment, the phrase of the first expiration value being used to determine a maximum running time of a first timer includes: when a running time of the first timer reaches the first expiration value, the first timer expires.

In one embodiment, the phrase of the first expiration value being used to determine a maximum running time of a first timer includes: when a running time of the first timer reaches the first expiration value, the first timer does not continue to time.

In one embodiment, the action of starting a first timer includes: the first timer starts timing.

In one embodiment, the action of starting a first timer includes: the first timer starts running.

In one embodiment, the action of stopping the first timer includes: the first timer stops timing.

In one embodiment, the action of stopping the first timer includes: the first timer does not continue to run.

In one embodiment, the third signaling is transmitted via an air interface.

In one embodiment, the third signaling is transmitted via an antenna port.

In one embodiment, the third signaling comprises a downlink signal.

In one embodiment, the third signaling comprises a sidelink signal.

In one embodiment, the third signaling comprises all or part of a high-layer signaling.

In one embodiment, the third signaling comprises all or part of a higher-layer signaling.

In one embodiment, the third signaling comprises an RRC message.

In one embodiment, the third signaling comprises all or partial IEs in an RRC message.

In one embodiment, the third signaling comprises all or partial fields of an IE in an RRC message.

In one embodiment, the third signaling is all or partial fields in an RRCReconfiguration message.

In one embodiment, the third signaling is all or partial fields in an RRCConnectionReconfiguration message.

In one embodiment, the third signaling is all or partial fields in an RRCResume message.

In one embodiment, the third signaling is all or partial fields in an RRCConnectionResume message.

In one embodiment, the third signaling is all or partial fields in an RRCReestablishment message.

In one embodiment, the third signaling is all or partial fields in an RRCConnectionReestablishment message.

In one embodiment, the third signaling is all or partial fields in an RRCSetup message.

In one embodiment, the third signaling is all or partial fields in an RRCConnectionSetup message.

In one embodiment, the third signaling is all or partial fields in an SIB1 message.

In one embodiment, the third signaling is all or partial fields in a SystemInformationBlockType1 message.

In one embodiment, the third signaling comprises an attemptSCGResume.

In one embodiment, the third signaling comprises an attemptSCGActivation.

In one embodiment, the third signaling comprises an attemptSCGRestore.

In one embodiment, the third signaling comprises a restoreSCG.

In one embodiment, the third signaling comprises a resumeSCG.

In one embodiment, the third signaling comprises an activateSCG.

In one embodiment, the third signaling and the first signaling belong to a same RRC message.

In one embodiment, the third signaling and the first signaling are different IEs in a same RRC message.

In one embodiment, the third signaling and the first signaling are different fields in a same IE in a same RRC message.

In one embodiment, the phrase of the third signaling being used to indicate whether the second cell enters into the third state from the first state includes: whether the third signaling exists is used to indicate whether the second cell enters into the third state from the first state.

In one subembodiment of the above embodiment, the third signaling existing is used to indicate that the second cell enters into the third state from the first state.

In one subembodiment of the above embodiment, the third signaling not existing is used to indicate that the second cell does not enter into the third state from the first state.

In one embodiment, the third signaling is used to indicate when the second cell is in the first state and an RLF occurring in a first cell is determined, whether the second cell enters into the third state from the first state.

In one embodiment, the third signaling indicates whether the first node possesses an ability of switching the second cell from the first state to the third state.

In one embodiment, the third signaling comprises one bit.

In one embodiment, the third signaling comprises P1 bit(s), P1 being a positive integer.

In one embodiment, when the third signaling is set as a true value, it is indicated that the second cell enters into the third state from the first state.

In one subembodiment of the above embodiment, the true value comprises true.

In one subembodiment of the above embodiment, the true value comprises 1.

In one embodiment, when the third signaling is set as a false value, it is indicated that the second cell does not enter into the third state from the first state.

In one subembodiment of the above embodiment, the false value comprises false.

In one subembodiment of the above embodiment, the false value comprises 1.

In one embodiment, the switching the second cell to the third state includes receiving the second radio signal.

In one embodiment, the switching the second cell to the third state includes recovering a radio bearer between the first node and the second cell.

In one embodiment, the action of determining that the second cell enters into a third state comprises starting the first timer.

In one embodiment, the action of determining that the second cell enters into a third state comprises the third signaling indicates that the second cell enters into the third state from the first state.

In one embodiment, the phrase of "when a first condition set being satisfied, starting the first timer" includes when the first node determines to switch the second cell from the first state to the third state, starting the first timer.

In one embodiment, when the first condition set is satisfied, the first timer is started and the first radio signal is transmitted.

In one embodiment, the phrase of "when the first timer is running, switching the second cell to the third state, and stopping the first timer" includes when a running time of the first timer is not greater than the first expiration value and if the second cell switches to the second state, stopping the first timer.

In one embodiment, the phrase of "when the first timer is running, switching the second cell to the third state, and stopping the first timer" includes when the first timer is running and if a radio bearer between the first node and the second cell is recovered, stopping the first timer.

In one embodiment, when the first timer is running and the second radio signal is received, the first timer is stopped.

In one embodiment, the phrase of "when the first time expires, initiating an RRC connection re-establishment procedure" includes when a running time of the first timer reaches the first expiration value, initiating an RRC connection re-establishment procedure.

In one embodiment, the phrase of "when the first time expires, initiating an RRC connection re-establishment procedure" includes when a running time of the first timer reaches the first expiration value, performing an RRC connection re-establishment procedure.

In one embodiment, when the first timer is expired, an RRC IDLE state is entered.

In one embodiment, when the first timer is expired, a cell re-selection procedure is performed.

In one embodiment, the dotted box F5 is optional.

In one embodiment, the dotted box F6 is optional.

In one embodiment, either the dotted box F5 or the dotted box F6 exists.

In one embodiment, both the dotted box F5 and the dotted box F6 exist.

In one embodiment, neither the dotted box F5 nor the dotted box F6 exists.

Embodiment 8B

Embodiment 8B illustrates a structure block diagram of a processing device in a second node according to one embodiment of the present disclosure, as shown in FIG. 8B. In FIG. 8B, a second node's processing device 800 comprises a second receiver 801 and a second transmitter 802.

The second receiver 801 receives first information through a second serving cell group;
   in Embodiment 8B, the first information indicates a buffer state of a first serving cell group; the first serving cell group is in an inactive state; when the first serving cell group is in an active state, the first information is transmitted through the first serving cell group; the first serving cell group and the second serving cell group are respectively an SCG and an MCG.

In one embodiment, the second transmitter 802 transmits a first signaling through a second serving cell group;
   herein, the first signaling is monitored on the second serving cell group; when the first signaling is detected, starts monitoring a control signaling of the first serving cell group; the first serving cell group is in an inactive state; and the first information is used to trigger the first signaling.

In one embodiment, when there is data to be transmitted in a first MAC entity, the first information is generated.

In one embodiment, the first MAC entity corresponds to an RB between the first node and a first serving cell group to which it belongs.

In one embodiment, the first MAC entity corresponds to a first serving cell group.

In one embodiment, the first information is transmitted via an RRC signaling.

In one embodiment, the first information is transmitted via a MAC CE.

In one embodiment, the second transmitter 802 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the second transmitter 802 comprises the antenna 452, the transmitter/receiver 454, the multi-antenna transmitting processor 457, the transmitting processor 468, the controller/processor 459, the memory 460 and the data source 467 in FIG. 4 of the present disclosure.

In one embodiment, the second receiver 801 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the second receiver 801 comprises the antenna 452, the receiver 454, the multi-antenna receiving processor 458, the receiving processor 456, the controller/processor 459, the memory 460 and the data source 467 in FIG. 4 of the present disclosure.

Embodiment 9

Embodiment 9 illustrates a schematic diagram of behavior of a first node when a second cell is in a different state, as shown in FIG. 9. It is particularly underlined that the order illustrated in the embodiment does not put constraints over sequences of signal transmissions and implementations.

In Embodiment 9, the first node determines that an RLF occurs in a first cell in step S901; if the second cell is in a first state, goes to step S902(a), then performs step S903(a), determines that the second cell enters into a third state, jumps to step S902(b), the second cell is in the third state in step S902(b), then performs step S903(b), transmits a first message; if the second cell is in a third state, goes to step S902(b), performs step S903(b), transmits a first message; if the second cell is in a second state, goes to step S902(c), then performs step S903(c), transmits a second message.

In one embodiment, the step S902(a), the step S902(b) and the step S902(c) do not occur at the same time.

In one embodiment, the step S902(a), the step S902(b) and the step S902(c) are taken before the step S901.

In one embodiment, the step S902(a), the step S902(b) and the step S902(c) are taken after the step S901.

In one embodiment, before transmitting the first message, if the second cell is in the first state, first the step S903(a) is performed, the second cell is switched to the third state.

Embodiment 10

Embodiment 10 illustrates a schematic diagram of a first field being used to indicate a cause for transmitting a first radio signal according to one embodiment of the present disclosure, as shown in FIG. 10.

In Embodiment 10, the behavior of determining that the second cell enters into a third state in the present disclosure includes transmitting a first radio signal, the first radio signal comprising a first field; herein, the first radio signal is used to trigger the second cell to enter into the third state, and the first field is used to indicate a cause for transmitting a first radio signal.

In one embodiment, the phrase of the first radio signal comprising a first field comprises that the first field is a field in the first radio signal.

In one embodiment, the phrase of the first radio signal comprising a first field comprises that the first field is an IE in the first radio signal.

In one embodiment, the phrase of the first radio signal comprising a first field comprises that the first field is all or part of the first radio signal.

In one embodiment, the phrase of the first field being used to indicate a cause for transmitting a first radio signal includes: the first radio signal comprises an RRC connection recovery request information, and the first field indicates a cause for initiating an RRC connection recovery.

In one embodiment, the phrase of the first field being used to indicate a cause for transmitting a first radio signal includes: the first field indicates that the second cell is switched to the third state.

In one embodiment, the phrase of the first field being used to indicate a cause for transmitting a first radio signal includes: the first field indicates that the second cell is switched from a democracy state to a non-democracy state.

In one embodiment, the phrase of the first field being used to indicate a cause for transmitting a first radio signal includes: the first field indicates that the second cell is switched from the first state to the third state.

In one embodiment, the phrase of the first field being used to indicate a cause for transmitting a first radio signal includes: the first field indicates that an RLF occurs in an MCG.

In one embodiment, the phrase of the first field being used to indicate a cause for transmitting a first radio signal includes: the first field indicates performing an MCG link recovery through an SCG.

In one embodiment, the phrase of the first field being used to indicate a cause for transmitting a first radio signal includes: the first field indicates performing an MCG Failure Information procedure.

In one embodiment, the phrase of the first field being used to indicate a cause for transmitting a first radio signal includes: the first field indicates activating an SCG.

In one embodiment, the first field comprises a ResumeCause.

In one embodiment, the first field comprises a establishmentCause.

In one embodiment, the first field comprises a delayTolerantAccess.

In one embodiment, a name of the first field comprises a ResumeCause.

In one embodiment, the first field comprises an scg-Activation.

In one embodiment, the first field comprises an scgActivation.

In one embodiment, the first field comprises a pscell-Activation.

In one embodiment, the first field comprises a pscellActivation.

In one embodiment, the first field comprises an mcg-Recovery.

In one embodiment, the first field comprises mcgFailure-Information.

In one embodiment, the first field comprises an mcg-RLF.

In one embodiment, the first field comprises an emergency.

In one embodiment, the first field comprises a highPriorityAccess.

In one embodiment, the first field comprises an mt-Access.

In one embodiment, the first field comprises an mo-Signalling.

In one embodiment, the first field comprises an mo-Data.

In one embodiment, the first field comprises an mo-VoiceCall.

In one embodiment, the first field comprises an mo-VideoCall.

In one embodiment, the first field comprises an mo-SMS.

In one embodiment, the first field comprises an ma-Update.

In one embodiment, the first field comprises an mps-PriorityAccess.

In one embodiment, the first field comprises an mcs-PriorityAccess.

Embodiment 11

Embodiment 11 illustrates a schematic diagram of a first bitmap being used to indicate a state of a second cell according to one embodiment of the present disclosure, as shown in FIG. 11. In FIG. 11, each solid box represents a bit, the dotted box represents the first bitmap, and 1/0 represents that a bit is set as 1 or 0.

In embodiment 11, the first signaling comprises a first bitmap, the first bitmap is used to indicate a state of a second cell; the first bitmap comprises Q1 bit(s), the Q1 bit(s) corresponds (respectively correspond) to Q1 cell(s), and the second cell is one of the Q1 cell(s).

In Embodiment 11, the second radio signal comprises a first bitmap, and the first bitmap is used to indicate a state of a second cell; the first bitmap comprises Q1 bit(s), the Q1 bit(s) corresponds (respectively correspond) to Q1 cell(s), and the second cell is one of the Q1 cell(s).

In one embodiment, the first bitmap is used to indicate that the second cell enters into the first state.

In one embodiment, the first bitmap is used to indicate that the second cell enters into the third state.

In one embodiment, when one of the Q1 bit(s) is set as 1, it is indicated that a cell corresponding to the one bit is set as the first state.

In one embodiment, when one of the Q1 bit(s) is set as 0, it is indicated that a cell corresponding to the one bit is set as the third state.

In one embodiment, when one of the Q0 bit(s) is set as 0, it is indicated that a cell corresponding to the one bit is set as the first state.

In one embodiment, when one of the Q1 bit(s) is set as 1, it is indicated that a cell corresponding to the one bit is set as the third state.

In one embodiment, the Q1 is equal to a non-negative integral multiple of 8.

In one embodiment, the Q1 is equal to 8.
In one embodiment, the Q1 is equal to 16.
In one embodiment, the Q1 is equal to 24.
In one embodiment, the Q1 is equal to 32.
In one embodiment, the Q1 cell(s) is(are) associated with a same SCG.

In one subembodiment of the above embodiment, one of the Q1 cell(s) comprises a PSCell.

In one subembodiment of the above embodiment, one of the Q1 cell(s) comprises an SCell.

In one subembodiment of the above embodiment, when a bit corresponding to the PSCell is set as 0, remaining bit(s) in the Q1 bit(s) is(are) set as 0.

In one subembodiment of the above embodiment, when a PSCell is set as the first state, an SCell in the SCG is set as the first state.

In one subembodiment of the above embodiment, when a PSCell is set as the third state, an SCell in the SCG is set as the first state or the third state.

In one embodiment, the Q1 cell(s) is(are) associated with Q1 SCG(s).

In one subembodiment of the above embodiment, one of the Q1 cell(s) comprises a PSCell.

In one subembodiment of the above embodiment, one of the Q1 cell(s) comprises an SCG.

In one subembodiment of the above embodiment, bit(s) corresponding to Q2 cell(s) in the Q1 cell(s) is(are) set as 0, Q2 being a non-negative integer not greater than Q1.

Embodiment 12

Figure 12:
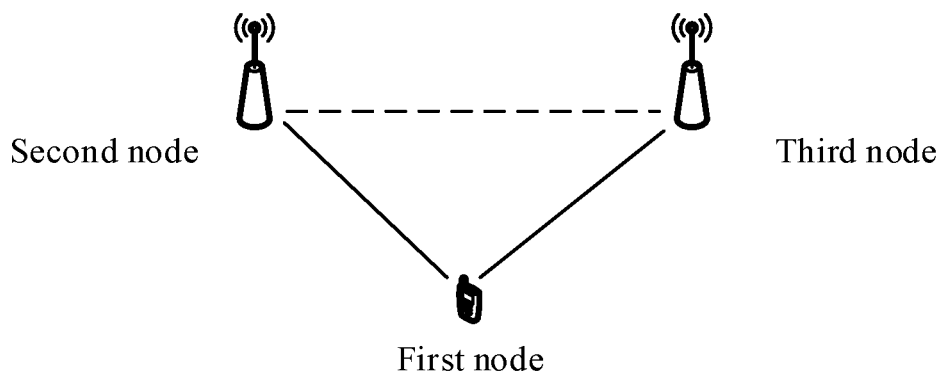
FIG. 12 illustrates a schematic diagram of a first node being connected with a second node and a third node at the same time according to one embodiment of the present disclosure.

Embodiment 12 illustrates a schematic diagram of a first node being connected with a second node and a third node simultaneously according to one embodiment of the present disclosure. In FIG. 12, the first node is a UE, and the second node and the third node are respectively two base stations; two solid lines respectively represent a link between the first node and the second node as well as a link between the first node and the third node; the dotted line represents a link between the second node and the third node.

In Embodiment 12, the first node is connected with the second node and the third node simultaneously.

In one embodiment, the second node comprises the second node N02 in the present disclosure.

In one embodiment, the second node comprises the third node N03 in the present disclosure.

In one embodiment, the second node is the second-type node in the present disclosure.

In one embodiment, the third node is the second-type node in the present disclosure.

In one embodiment, the second node and the third node are connected via an Xn interface.

In one embodiment, the second node and the third node are connected via an Xn-C interface.

In one embodiment, the second node and the third node are connected via an X2-C interface.

In one embodiment, a link between the second node and the third node is a non-ideal backhaul.

In one embodiment, a link between the second node and the third node is an ideal backhaul.

In one embodiment, the second node and the third node are connected via an optical fiber.

In one embodiment, the second node and the third node are connected via wireless connection.

In one embodiment, the second node and the third node are connected via wired connection.

In one embodiment, the second node and the third node are connected via multi-hop connection.

In one embodiment, the first node and the third node are connected via a Uu interface.

In one embodiment, the first node and the second node are connected via a Uu interface.

In one embodiment, the first node is a device that supports dual connectivity.

In one embodiment, the first node supports Multi-Radio Dual Connectivity (MR-DC).

In one embodiment, the first node supports NR-NR Dual Connectivity (NR DC).

In one embodiment, the first node supports Intra-E-UTRA DC.

In one embodiment, the first node supports NR-E-UTRA Dual Connectivity (NE-DC).

In one embodiment, the first node supports NG-RAN E-UTRA-NR Dual Connectivity (NGEN-DC).

In one embodiment, the first node supports E-UTRA-NR Dual Connectivity (EN DC).

In one embodiment, a Signaling Radio Bearer between the first node and the second node comprises SRB1.

In one embodiment, a Signaling Radio Bearer between the first node and the second node comprises SRB2.

In one embodiment, a Signaling Radio Bearer between the first node and the second node comprises SRB3.

In one embodiment, a Signaling Radio Bearer between the first node and the third node comprises SRB1.

In one embodiment, a Signaling Radio Bearer between the first node and the third node comprises SRB2.

In one embodiment, a Signaling Radio Bearer between the first node and the third node comprises SRB3.

In one embodiment, the second node comprises an MN, and the third node comprises an SN.

In one embodiment, the second node comprises a Master eNodeB (MeNB), and the third node comprises a Secondary eNodeB (SgNB).

In one embodiment, the second node comprises a Centralized Unit (CU), and the third node comprises a DU.

In one embodiment, the second node comprises a node in an MCG, and the third node comprises a node in an SCG.

In one embodiment, the second node comprises an SN, and the third node comprises an MN.

In one embodiment, the second node comprises an SgNB, and the third node comprises an MeNB.

In one embodiment, the second node comprises a Distributed Unit (DU), and the third node comprises a CU.

In one embodiment, the second node comprises a node in an SCG, and the third node comprises a node in an MCG.

In one embodiment, the second node comprises a maintenance base station of a PCell, and the third node comprises a maintenance base station of a PSCell.

In one embodiment, the second node comprises a maintenance base station of a PSCell, and the third node comprises a maintenance base station of a PCell.

Embodiment 13

Figure 13:
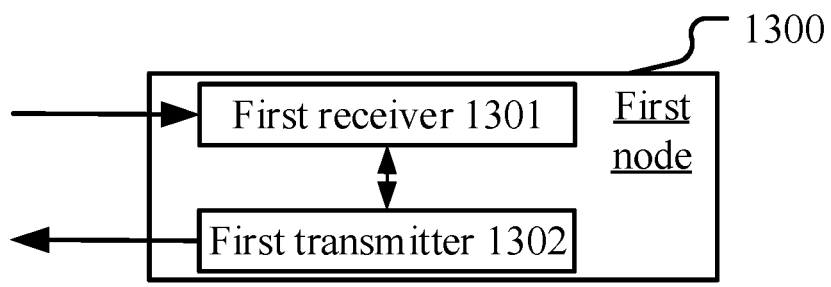
FIG. 13 illustrates a structure block diagram of a processing device in a first node according to one embodiment of the present disclosure.

Embodiment 13 illustrates a structure block diagram of a processing device in a first node according to one embodiment of the present disclosure, as shown in FIG. 13. In FIG. 13, the first node's processing device 1300 comprises a first receiver 1301 and a first transmitter 1302.

A first receiver 1301 determines that an RLF occurs in a first cell;

a first transmitter 1302, when a second cell is in a first state, as a response to determining that the RLF occurs in the first cell, determines that the second cell enters into a third state, and transmits a first message; when the second cell is in a second state, as a response to determining that the RLF occurs in the first cell, transmits a second message; when the second cell is in a third state, as a response to determining that the RLF occurs in the first cell, transmits the first message;

in Embodiment 12, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, the behavior of determining that the second cell enters into a third state comprises recovering a radio bearer with the second cell.

In one embodiment, the behavior of determining that the second cell enters into a third state comprises the first transmitter 1302 transmits a first radio signal; herein, the first radio signal is used to trigger the second cell to enter into the third state.

In one embodiment, the behavior of determining that the second cell enters into a third state comprises the first receiver 1301 receives a second radio signal; herein, the second radio signal is used to trigger the second cell to enter into the third state.

In one embodiment, the first receiver 1301, receives a first signaling; herein, the first signaling is used to indicate the second cell to enter into the first state.

In one embodiment, the first receiver 1301 receives a second signaling; when a first condition set is satisfied, starts a first timer; when the first timer is running, switches the second cell to the third state, and stops the first timer; when the first timer is expired, initiates an RRC connection re-establishment procedure; herein, the second signaling comprises a first expiration value, and the first expiration value is used to determine a maximum running time of the first timer.

In one embodiment, the first receiver 1301 receives a third signaling; herein, the third signaling is used to indicate whether the second cell enters into the third state from the first state.

In one embodiment, the first receiver 1301 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1301 comprises the antenna 452, the receiver 454, the multi-antenna receiving processor 458 and the receiving processor 456 in FIG. 4 of the present disclosure.

In one embodiment, the first receiver 1301 comprises the antenna 452, the receiver 454 and the receiving processor 456 in FIG. 4 of the present disclosure.

In one embodiment, the first transmitter 1302 comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1302 comprises the antenna 452, the transmitter 454, the multi-antenna transmitting processor 457 and the transmitting processor 468 in FIG. 4 of the present disclosure.

In one embodiment, the first transmitter 1302 comprises the antenna 452, the transmitter 454 and the transmitting processor 468 in FIG. 4 of the present disclosure.

Embodiment 14

Figure 14:
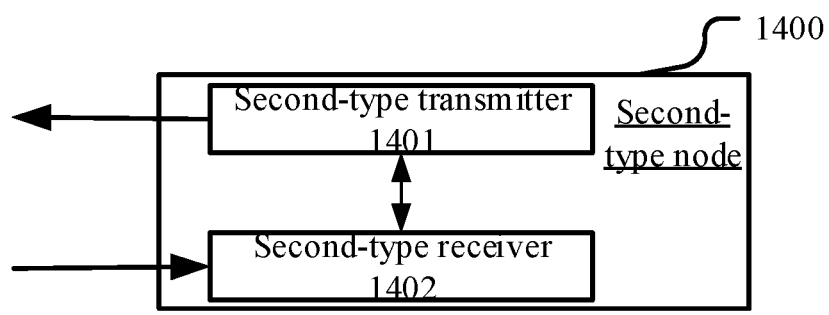
FIG. 14 illustrates a structure block diagram of a processing device in a second-type node according to one embodiment of the present disclosure.

Embodiment 14 illustrates a structure block diagram of a processing device in a second-type node according to one embodiment of the present disclosure, as shown in FIG. 14. In FIG. 14, a second-type node's processing device 1400 comprises a second-type transmitter 1401 and a second-type receiver 1402.

a second-type receiver 1402, when a second cell is in a first state, as a response that a first cell is determined to have an RLF, determines that the second cell enters into a third state, and receives a first message; when the second cell is in a second state, as a response that a first cell is determined to have an RLF, receives a second message; when the second cell is in a third state, as a response that a first cell is determined to have an RLF, receives the first message;

In Embodiment 14, the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

In one embodiment, the second-type node used to receive the first message comprises a maintenance base station of the first cell.

In one embodiment, the second-type node used to receive the first message comprises a maintenance base station of the second cell.

In one embodiment, the second-type node comprises a receiver of the second message.

In one embodiment, a receiver of the second message is determined through cell selection.

In one embodiment, the second-type node comprises a receiver of the first message.

In one embodiment, the behavior of determining that the second cell enters into a third state comprises recovering a radio bearer between a transmitter of the first message and the second cell.

In one embodiment, the behavior of determining that the second cell enters into a third state comprises the second-type receiver 1402 receives a first radio signal; herein, the first radio signal is used to trigger the second cell to enter into the third state.

In one embodiment, the second-type node used to receive the first radio signal comprises a maintenance base station of the second cell.

In one embodiment, the behavior of determining that the second cell enters into a third state comprises the second-type transmitter 1401 transmits a second radio signal; herein, the second radio signal is used to trigger the second cell to enter into the third state.

In one embodiment, the second-type node used to transmit the second radio signal comprises a maintenance base station of the second cell.

In one embodiment, the second-type transmitter 1401 transmits a first signaling; herein, the first signaling is used to indicate the second cell to enter into the first state.

In one embodiment, the second-type node used to transmit the first signaling comprises a maintenance base station of the second cell.

In one embodiment, the second-type node used to transmit the first signaling comprises a maintenance base station of the first cell.

In one embodiment, the second-type transmitter 1401 transmits a second signaling; herein, the second signaling comprises a first expiration value, and the first expiration value is used to determine a maximum running time of the first timer; when a first condition set is satisfied, a first timer is started; when the first timer is running, the second cell is switched to the second state, and the first timer is stopped; when the first timer is expired, an RRC connection re-establishment procedure is initiated.

In one embodiment, the second-type node used to transmit the second signaling comprises a maintenance base station of the second cell.

In one embodiment, the second-type node used to transmit the second signaling comprises a maintenance base station of the first cell.

In one embodiment, the second-type transmitter 1401 transmits a third signaling; herein, the third signaling is used to indicate whether the second cell enters into the third state from the first state.

In one embodiment, the second-type node used to transmit the third signaling comprises a maintenance base station of the second cell.

In one embodiment, the second-type node used to transmit the third signaling comprises a maintenance base station of the first cell.

In one embodiment, the second-type transmitter 1401 comprises the antenna 420, the transmitter 418, the multi-antenna transmitting processor 471, the transmitting processor 416, the controller/processor 475 and the memory 476 in FIG. 4 of the present disclosure.

In one embodiment, the second-type transmitter 1401 comprises the antenna 420, the transmitter 418, the multi-antenna transmitting processor 471 and the transmitting processor 416 in FIG. 4 of the present disclosure.

In one embodiment, the second-type transmitter 1401 comprises the antenna 420, the transmitter 418 and the transmitting processor 416 in FIG. 4 of the present disclosure.

In one embodiment, the second-type receiver 1402 comprises the antenna 420, the receiver 418, the multi-antenna receiving processor 472, the receiving processor 470, the controller/processor 475 and the memory 476 in FIG. 4 of the present disclosure.

In one embodiment, the second-type receiver 1402 comprises the antenna 420, the receiver 418, the multi-antenna receiving processor 472 and the receiving processor 470 in FIG. 4 of the present disclosure.

In one embodiment, the second-type receiver 1402 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node used for wireless communications, comprising:
   a first receiver, determining that a Radio Link Failure (RLF) occurs in a first cell; and
   a first transmitter, when a second cell is in a first state, as a response to determining that the RLF occurs in the first cell, determining that the second cell enters into a third state, and transmitting a first message; when the second cell is in a second state, as a response to determining that the RLF occurs in the first cell, transmitting a second message; when the second cell is in a third state, as a response to determining that the RLF occurs in the first cell, transmitting the first message;
   wherein the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

2. The first node according to claim 1, wherein the behavior of determining that the second cell enters into a third state comprises recovering a radio bearer with the second cell.

3. The first node according to claim 1, wherein the behavior of determining that the second cell enters into a third state comprises:
   the first transmitter, transmitting a first radio signal;
   wherein the first radio signal is used to trigger the second cell to enter into the third state.

4. The first node according to claim 1, wherein the behavior of determining that the second cell enters into a third state comprises:
   the first receiver, receiving a second radio signal;
   wherein the second radio signal is used to trigger the second cell to enter into the third state.

5. The first node according to claim 1, comprising:
   the first receiver, receiving a first signaling;
   wherein the first signaling is used to indicate the second cell to enter into the first state.

6. The first node according to claim 1, comprising:
   the first receiver, receiving a second signaling; when a first condition set is satisfied, starting a first timer; when the first timer is running, switching the second cell to the third state, and stopping the first timer; when the first timer is expired, initiating an RRC connection re-establishment procedure;
   wherein the second signaling comprises a first expiration value, and the first expiration value is used to determine a maximum running time of the first timer.

7. The first node according to claim 1, comprising:
   the first receiver, receiving a third signaling;
   wherein the third signaling is used to indicate whether the second cell enters into the third state from the first state.

8. A second-type node for wireless communications, comprising:
   a second receiver, when a second cell is in a first state, as a response that a first cell is determined to have an RLF, determining that the second cell enters into a third state, and receiving a first message; when the second cell is in a second state, as a response that a first cell is determined to have an RLF, receiving a second message; when the second cell is in a third state, as a response that a first cell is determined to have an RLF, receiving the first message;

wherein the first message is used for a radio link recovery; the second message is used for a radio connection re-establishment; when the second cell is in the first state, a transmitter of the first message does not monitor a control signaling on the second cell; and when the second cell is in the third state, a transmitter of the second message monitors the control signaling on the second cell.

9. The second-type node according to claim 8, wherein the behavior of determining that the second cell enters into a third state comprises:

the second receiver, receiving a first radio signal;
wherein the first radio signal is used to trigger the second cell to enter into the third state.

10. The second-type node according to claim 8, wherein the behavior of determining that the second cell enters into a third state comprises:

the second transmitter, transmitting a second radio signal;
wherein the second radio signal is used to trigger the second cell to enter into the third state.

11. The second-type node according to claim 8, comprising:

the second transmitter, transmitting a first signaling;
wherein the first signaling is used to indicate the second cell to enter into the first state.

12. The second-type node according to claim 8, comprising:

the second transmitter, transmitting a second signaling;
wherein the second signaling comprises a first expiration value, and the first expiration value is used to determine a maximum running time of the first timer; when a first condition set is satisfied, a first timer is started; when the first timer is running, the second cell is switched to the third state, and the first timer is stopped; when the first timer is expired, an RRC connection re-establishment procedure is initiated.

13. The second-type node according to claim 8, comprising:

the second transmitter, transmitting a third signaling;
wherein the third signaling is used to indicate whether the second cell enters into the third state from the first state.

14. A method in a first node for wireless communications, comprising:

determining that an RLF occurs in a first cell; and
when a second cell is in a first state, as a response to determining that the RLF occurs in the first cell, determining that the second cell enters into a third state, and transmitting a first message; when the second cell is in a second state, as a response to determining that the RLF occurs in the first cell, transmitting a second message; when the second cell is in a third state, as a response to determining that the RLF occurs in the first cell, transmitting the first message;

wherein the first message is used for a radio link recovery; the second message is used for a radio connection re-establishment; when the second cell is in the first state, the first node does not monitor a control signaling on the second cell; and when the second cell is in the third state, the first node monitors the control signaling on the second cell.

15. The method in a first node for wireless communications according to claim 14, wherein the behavior of determining that the second cell enters into a third state comprises recovering a radio bearer with the second cell.

16. The method in a first node for wireless communications according to claim 14, wherein the behavior of determining that the second cell enters into a third state comprises:

transmitting a first radio signal;
wherein the first radio signal is used to trigger the second cell to enter into the third state.

17. The method in a first node for wireless communications according to claim 14, wherein the behavior of determining that the second cell enters into a third state comprises:

receiving a second radio signal;
wherein the second radio signal is used to trigger the second cell to enter into the third state.

18. The method in a first node for wireless communications according to claim 14, comprising:

receiving a first signaling;
wherein the first signaling is used to indicate the second cell to enter into the first state.

19. The method in a first node for wireless communications according to claim 14, comprising:

receiving a second signaling; and
when a first condition set is satisfied, starting a first timer; when the first timer is running, switching the second cell to the third state, and stopping the first timer; and when the first timer is expired, initiating an RRC connection re-establishment procedure;
wherein the second signaling comprises a first expiration value, and the first expiration value is used to determine a maximum running time of the first timer.

20. The method in a first node for wireless communications according to claim 14, comprising:

receiving a third signaling;
wherein the third signaling is used to indicate whether the second cell enters into the third state from the first state.

* * * * *